US012641124B2

(12) United States Patent
Payment et al.

(10) Patent No.: US 12,641,124 B2
(45) Date of Patent: May 26, 2026

(54) ACCESS CONTROL MANAGEMENT

(71) Applicant: Twilio Inc., San Francisco, CA (US)

(72) Inventors: Alexandre Payment, San Francisco, CA (US); Liran Nuna, Austin, TX (US); Mario Niebla, Encinitas, CA (US); Poojita Suri, San Francisco, CA (US); Ridhi Sahni, Mountain View, CA (US); Vivek K. Laddha, San Ramon, CA (US); Yoolhee Kayla Jin, South Pasadena, CA (US)

(73) Assignee: Twilio Inc., San Francisco, CA (US)

( * ) Notice: Subject to any disclaimer, the term of this patent is extended or adjusted under 35 U.S.C. 154(b) by 219 days.

(21) Appl. No.: 18/139,089

(22) Filed: Apr. 25, 2023

(65) Prior Publication Data

US 2023/0353599 A1 Nov. 2, 2023

Related U.S. Application Data

(60) Provisional application No. 63/363,698, filed on Apr. 27, 2022.

(51) Int. Cl.
| | |
|---|---|
| *H04L 9/40* | (2022.01) |
| *G06F 21/62* | (2013.01) |
| *H04L 9/32* | (2006.01) |

(52) U.S. Cl.
CPC .............. *H04L 63/20* (2013.01); *G06F 21/62* (2013.01); *G06F 21/6218* (2013.01); *H04L 9/3213* (2013.01); *H04L 63/10* (2013.01); *H04L 9/3247* (2013.01)

(58) Field of Classification Search
CPC ....... H04L 63/20; H04L 63/10; H04L 63/101; H04L 9/32; H04L 9/3213; H04L 9/3247; G06F 21/10; G06F 21/1014; G06F 21/62; G06F 21/6218
See application file for complete search history.

(56) References Cited

U.S. PATENT DOCUMENTS

| | | | |
|---|---|---|---|
| 2010/0235879 A1* | 9/2010 | Burnside ............. H04L 63/0263 709/224 |
| 2014/0052749 A1 | 2/2014 | Rissanen |
| 2014/0075568 A1* | 3/2014 | Sathyadevan ......... G06F 21/554 726/27 |
| 2014/0207861 A1* | 7/2014 | Brandwine ............. H04L 51/52 709/204 |
| 2014/0330856 A1* | 11/2014 | Rissanen ............. G06F 21/6218 707/759 |

(Continued)

OTHER PUBLICATIONS

"International Application Serial No. PCT US2023 066237, International Search Report mailed Jul. 11, 2023", 2 pgs.

(Continued)

*Primary Examiner* — Shaqueal D Wade-Wright
(74) *Attorney, Agent, or Firm* — Schwegman Lundberg & Woessner, P.A.

(57) ABSTRACT

Attribute-based access control (ABAC) methods, systems, and computer-readable media are disclosed. A request is received for providing an access to a resource. An ABAC policy associated with the resource that matches the request is identified. A predicate included in the ABAC policy is evaluated based on metadata associated with the resource. Access to the resource is provided based on the evaluating of the predicate.

20 Claims, 22 Drawing Sheets

(56) References Cited

U.S. PATENT DOCUMENTS

| | | | |
|---|---|---|---|
| 2015/0089575 A1* | 3/2015 | Vepa .................... | G06F 21/6281 |
| | | | 726/1 |
| 2016/0072814 A1* | 3/2016 | Martinelli ............. | G06F 21/604 |
| | | | 726/1 |
| 2018/0041491 A1* | 2/2018 | Gupta ..................... | G06F 9/547 |
| 2020/0244799 A1 | 7/2020 | Lawson et al. | |
| 2021/0306377 A1 | 9/2021 | Kundu et al. | |
| 2021/0374116 A1* | 12/2021 | Narasimhadevara ........................ | |
| | | | G06F 16/24573 |
| 2022/0271915 A1* | 8/2022 | Turner .................. | H04L 9/3263 |
| 2023/0353574 A1* | 11/2023 | Payment ............... | H04L 63/062 |
| 2024/0412266 A1* | 12/2024 | Usui ...................... | G06N 20/00 |

OTHER PUBLICATIONS

"International Application Serial No. PCT US2023 066237, Written Opinion mailed Jul. 11, 2023", 8 pgs.

"International Application Serial No. PCT US2023 066237, International Preliminary Report on Patentability mailed Nov. 7, 2024", 10 pgs.

"European Application Serial No. 23797510.7, Extended European Search Report mailed Oct. 27, 2025", 10 pgs.

"Security Assertion Markup Language SAML V2.0 Technical Overview", Oasis Open 2006, [Online]. Retrieved from the Internet URLhttp www.oasis-open.org committees download.php 22553 sstcsaml-tech-overview-2%200-d raft-13.pdf, Feb. 21, 2007, 50 pgs.

* cited by examiner

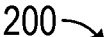
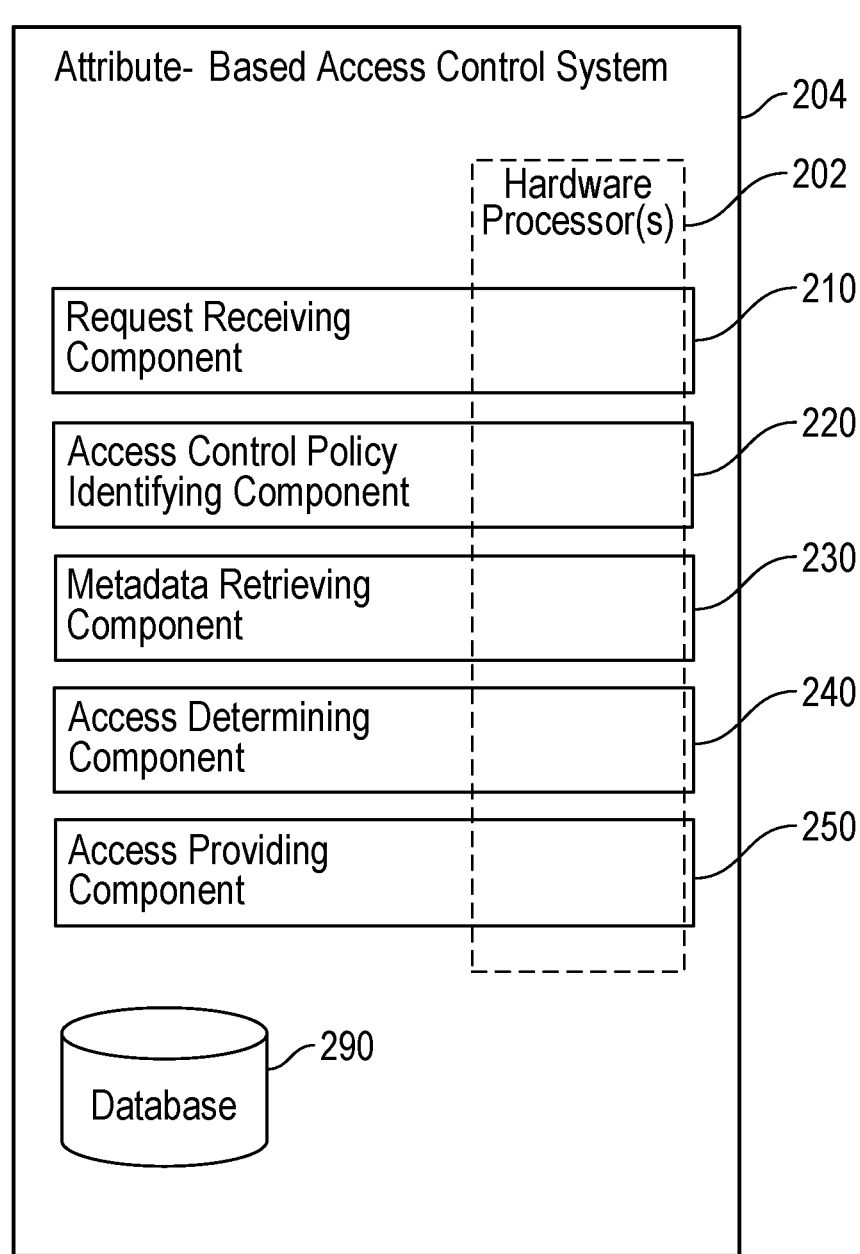
*FIG. 2*

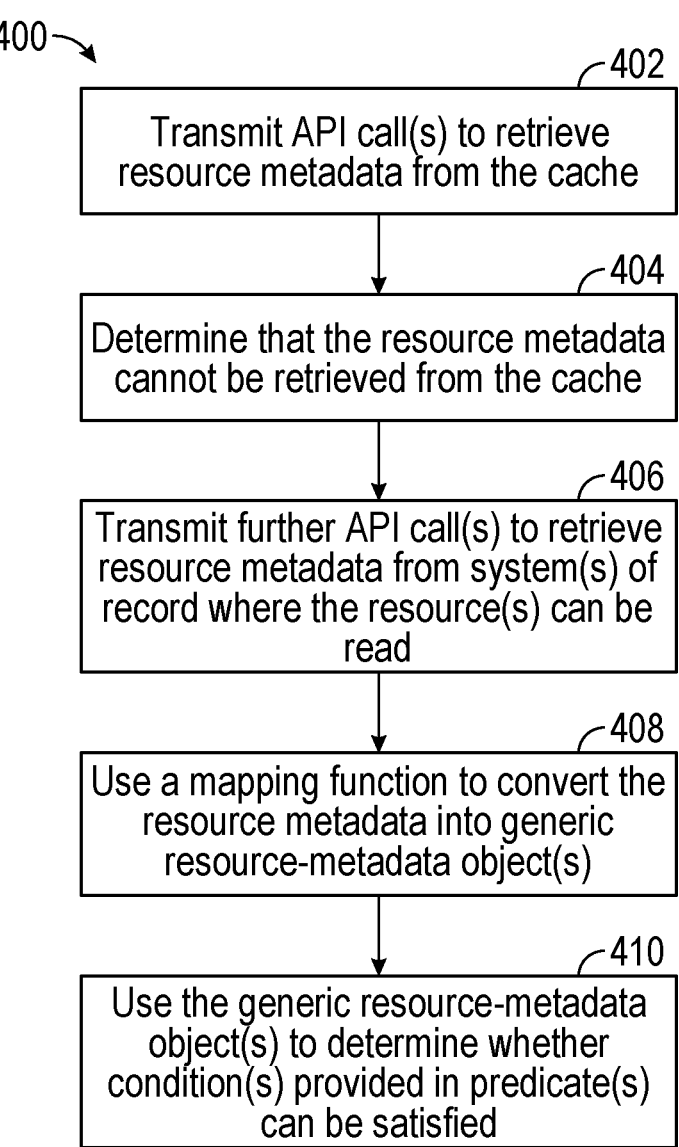

400

402
Transmit API call(s) to retrieve resource metadata from the cache

404
Determine that the resource metadata cannot be retrieved from the cache

406
Transmit further API call(s) to retrieve resource metadata from system(s) of record where the resource(s) can be read 408
Use a mapping function to convert the resource metadata into generic resource-metadata object(s)

410
Use the generic resource-metadata object(s) to determine whether condition(s) provided in predicate(s) can be satisfied

Role-based Access Control System

710

802

Hardware Processor(s)

URI Analyzing Component

810

Permission Classifying Component

820

Identity Identifying Component

830

Permission Graph Generating Component

840

Request Authorizing Component

850

880

DATABASE

900

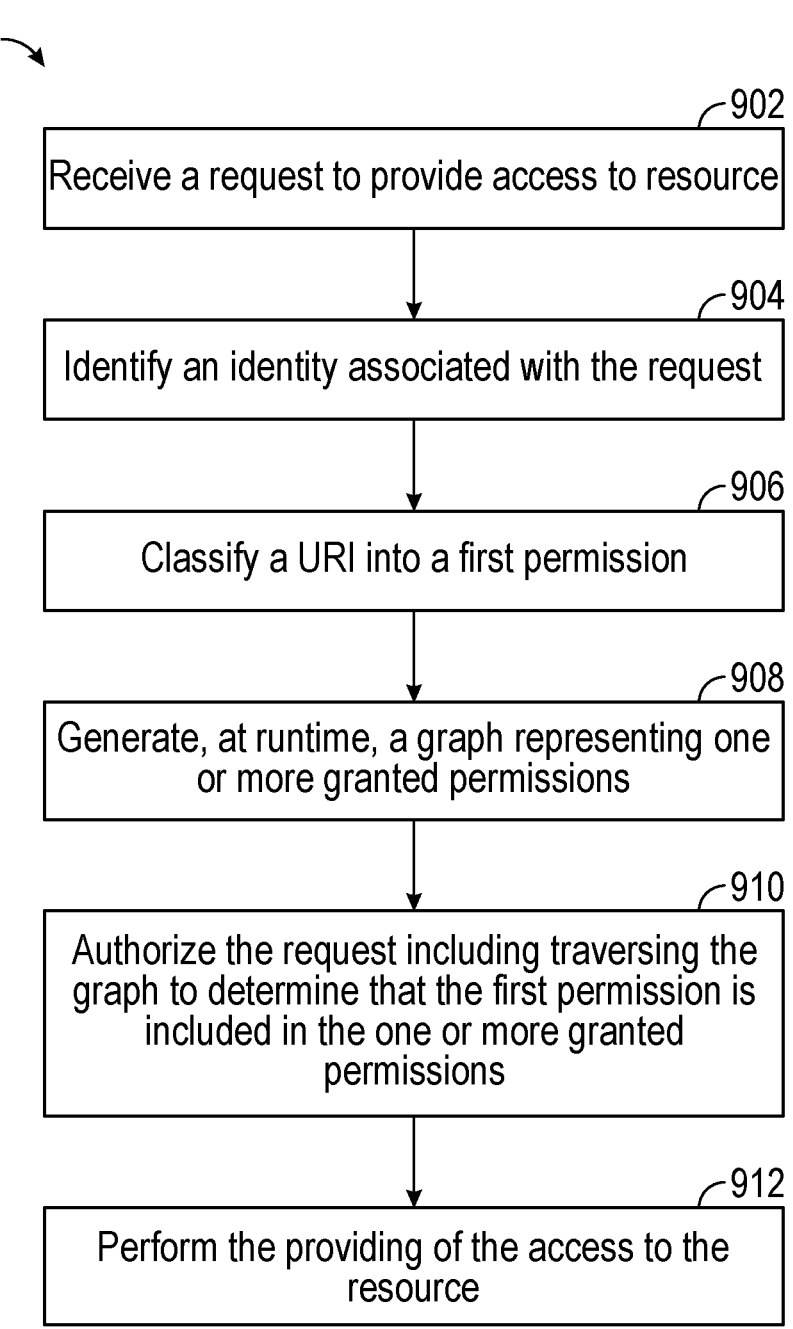

902

Receive a request to provide access to resource

904

Identify an identity associated with the request

906

Classify a URI into a first permission

908

Generate, at runtime, a graph representing one or more granted permissions

910

Authorize the request including traversing the graph to determine that the first permission is included in the one or more granted permissions

912

Perform the providing of the access to the resource

Role-Based Access Control System ⟋ 1310

Hardware Processor(s) ⟋ 1402

URI Analyzing Component ⟋ 1410

Permission Classifying Component ⟋ 1420

Identity Identifying Component ⟋ 1430

Permission Graph Generating Component ⟋ 1440

Request Authorizing Component ⟋ 1450

Role Generating Component ⟋ 1460

Serialized Token Generating Component ⟋ 1470

Serialized Token Passing Component ⟋ 1480

DATABASE ⟋ 1490

1500

1502

Receive a request to provide access to a resource

1504

Identify an permission(s) associated with the request

1506

Authorize the request

1508

Generate a serialized token to represent the permission(s)

1510

Pass the serialized token to service(s) to perform the providing of the access to the resource

1600

1502

1504

1602
Identify a URI associated with the request

1604
Classify, via a URI classifier, the URI into the plurality of permissions

1506

1606
Generate, at runtime, a graph representing one or more granted permissions

1608
Traverse the graph to determine permission(s) being included in the one or more granted permissions

1508

1510

ACCESS CONTROL MANAGEMENT

CROSS-REFERENCE TO RELATED APPLICATIONS

This application claims the benefit of U.S. Provisional Application Ser. No. 63/363,698, filed on Apr. 27, 2022, U.S. application Ser. No. 17/661,003, filed on Apr. 27, 2022, and U.S. application Ser. No. 17/661,009, filed on Apr. 27, 2022, each of which is incorporated by reference herein in its entirety.

TECHNICAL FIELD

The subject matter disclosed herein generally relates to the technical field of computer security and, in one specific example, to methods, systems, and machine-readable storage media for access-control management.

BACKGROUND

Current communication systems provide users with permissions to access resources based on limited types of roles, resulting in unintended access to resources that are restricted for certain users. Additionally, conventional solutions for providing controlled access can consume substantial computing resources, including data processing power, memory, bandwidth, and so on, especially when the implementation is at a large scale across multiple systems or services.

BRIEF DESCRIPTION OF DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 2 depicts a block diagram illustrating an example attribute-based access control system for managing access to resources, according to various example embodiments.

FIG. 4 depicts a flowchart illustrating another example method for managing access to resources using attribute-based access control by an example attribute-based access control system during operation, according to various example embodiments.

FIG. 9 depicts a flowchart illustrating an example method for managing access to resources by an example role-based access control system during operation, according to various example embodiments.

DETAILED DESCRIPTION

Figure 1:
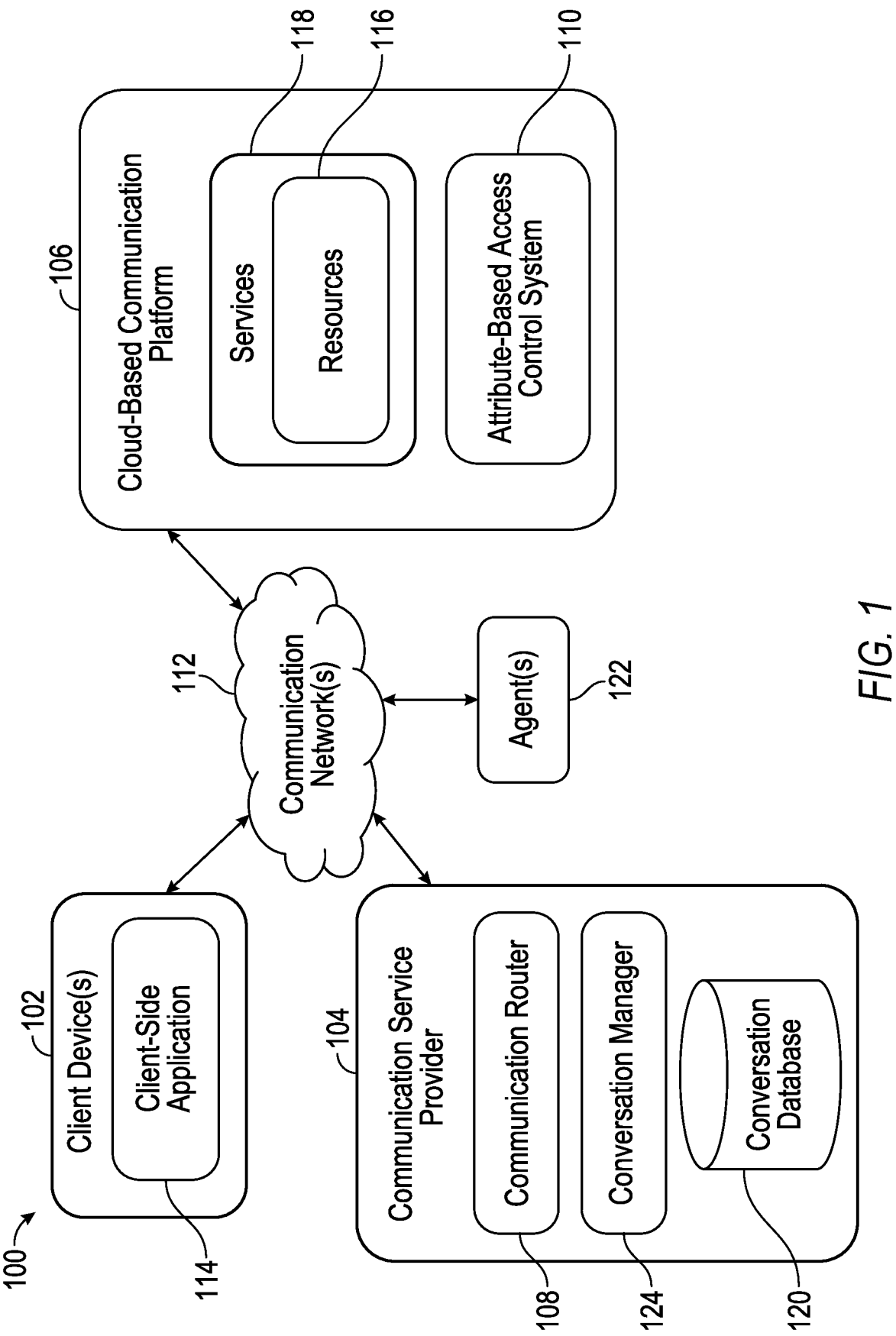
FIG. 1 depicts a block diagram showing an example networked environment in which the disclosed technology may be practiced, according to various example embodiments.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Various embodiments include systems, methods, and non-transitory computer-readable media for generating and managing access to resources using attribute-based access control ("ABAC"). An ABAC system provides a fine-grained and contextual access control that allows a large set of possible combinations of variables to reflect more definitive attribute-based access control policies. In various embodiments, the ABAC system receives a request for providing access to a resource in a communication platform (e.g., via a console interface or an API interface). The request can be sent from an identity, such as a person or an application user. The ABAC system identifies one or more attribute-based access control policies (also referred to as policies herein) associated with the resource. In various embodiments, the ABAC system identifies one or more attribute-based access control policies that match the request. An identity may be associated with the one or more attribute-based permissions (also referred to as attribute-based access control policies). For example, a role may be assigned to the identity and that the role corresponds to one or more attribute-based access control policies.

In various embodiments, an attribute-based access control policy can be represented by a text string that includes a namespace identifier, a product identifier, a resource identifier, an action identifier, and a predicate. A predicate can be a Boolean-valued function composed of one or more conditions of a form, including a predicate operator (e.g., >, <, ==), and its operands. The operands can be either constant values or be represented by terms of the form. For example, /XYZ/iam/api-keys/[$Resource.id !="CR123"] is an example attribute-based access control policy, where "XYZ" represents the namespace, "iam" represents the product, "api-keys" represents the resource, and "" represents any actions (e.g., read, create, update, delete, list, or do) that can be performed on the resource. "[$Resource.id !="CR123"]" represents a predicate that includes an attribute ("Resource.id") of the resource, and a value ("CR123") of the attribute. The predicate "[$Resource.id !="CR123"]" may be a Boolean-valued function that results in either a true or false value, as described herein. The predicate "[$Resource.id !="CR123"]" indicates all actions ("**") to the resource "api-keys" can be given, provided ("$") the attribute "resource.id" is not ("!=") value ("CR123"). In various embodiments, a predicate format may include one or more of the following elements: one or more expressions or conditions, logical operators, pre-defined variables, binary operators, pre-defined functions, string constraints, and so on.

In various embodiments, the ABAC system can use a proxy (e.g., a cached proxy) to retrieve metadata (also referred to as resource metadata) from a cache. The metadata is associated with the resource that is being requested. In various embodiments, metadata can correspond to values of attributes described herein. In various embodiments, an API call can be made to a service (e.g., resource metadata service) to retrieve such metadata. The API call can include the resource type identifier (e.g., calls, voice.calls) and/or the resource identifier (e.g., CR123). In various embodiments, if the ABAC system determines that the resource metadata is not stored in the cache, or for some other reasons that cannot be retrieved from the cache, the ABAC system can transmit an API call (e.g., a further API call) to retrieve the metadata from a system of record where the resource can be read.

In various embodiments, upon retrieving the resource metadata, the ABAC system can use a mapping function to convert the resource metadata into a generic resource-metadata object. The ABAC system can then use the generic resource-metadata object to perform various operations described herein, such as authorizing requests, including determining whether a condition provided in the predicate is satisfied.

In various embodiments, the ABAC system provides the access to the resource based on the determining of the access, in response to receiving the request.

In various embodiments, upon receiving the request, the ABAC system generates a graph that represents one or more attribute-based access control policies associated with the identity. The ABAC system may traverse the graph to identify an attribute-based access control policy that matches the request. In various embodiments, the graph may be generated at run time and dynamically updated at run time. For example, once a graph (also referred to as an assertion tree) is generated at run time, the graph may be stored in volatile computer memory (e.g., cache memory) for a limited time period, as a user is likely to request access to resources again shortly after making the first request. In various embodiments, a session may be initiated once a request is authenticated for a user. The graph may be temporarily stored in the cache memory for the duration of the session.

In various embodiments, in order to provide access to the requested resource based on the attribute-based access control policy identified from the graph, the ABAC system identifies metadata associated with the resource, identifies a predicate associated with the attribute-based access control policy, and determines whether the metadata (e.g., resource metadata) satisfies the condition provided in the predicate. If the predicate result is true, indicating the condition is satisfied, the ABAC system determines the access control policy matches the request. Otherwise, the access control policy does not match. For example, an attribute-based access control policy can be /XYZ/voice/calls/ [$language=='Spanish']. "XYZ" represents the namespace, "voice" represents the product, "calls" represents the resource, "" represents any actions to be performed on the resource, and [$language=='Spanish'] represents a predicate. To determine whether the metadata of the resource satisfies the condition, the ABAC system identifies the language type of the resource (e.g., "calls") based on the metadata (e.g., resource metadata), and determines if the language type is Spanish. The predicate function returns a true value if the language type is Spanish, indicating a match. Otherwise, the predicate function returns a false value. When there is a match, the ABAC system proceeds to provide access to the resource to the requesting identity.

Upon authorizing the request, the ABAC system generates a token to pass the attribute-based access control policies to one or more downstream services associated with the resource to provide the relevant access. In various embodiments, a service may include one or more resources. In various embodiments, downstream services may include a contact center, dialplan, phone number services, and so on. In various embodiments, the one or more downstream services can optionally be configured to process the graph generated by the ABAC system. A technical improvement is that these downstream services or systems do not need to implement their own separate access control systems. In various embodiments, they can be configured to handle the graph (also referred to as assertion tree) that is passed through to them by the ABAC system.

In various embodiments, the ABAC system signs the token before passing the token to one or more downstream services. In various embodiments, a token is signed using a digital signature algorithm (e.g., Edwards-curve Digital Signature Algorithm).

In various embodiments, a role may be created for an identity to include one or more attribute-based access control policies (also referred to as attribute-based permissions). In various embodiments, a user may be a person, a group of people, or an application. An application may be developed by a third party (e.g., a customer) using client-side SDK kits provided by the communication platform.

In various embodiments, the ABAC system causes a display of a user interface, including an indication of authorization status indicating whether the request is authorized. For example, the indication of authorization status may be a selectable user interface element (e.g., a window or an icon) notifying the user the request is either allowed or denied. In some examples, if the request is authorized, the ABAC system may cause the requested resource to be accessible by the requesting identity (e.g., displaying the resource in the user interface) or cause the action specified in the access control policy to be automatically executed (e.g., deleting the resource specified in the request).

In various embodiments, a request may be an API request that can be authenticated using an API key. An API request occurs when an identity (e.g., a person or an application user) adds an endpoint to a URI and makes a call to a server. An API endpoint refers to a touchpoint of an interaction between an API and a system. An API endpoint provides the location where an API accesses a resource.

In various embodiments, a request is received for providing an access to a resource. An ABAC policy associated with the resource that matches the request is identified. A predicate included in the ABAC policy is evaluated based on metadata associated with the resource. Access to the resource is provided based on the evaluation of the predicate.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 depicts a block diagram showing an example networked environment 100 in which the disclosed technology may be practiced, according to various example embodiments. As shown in FIG. 1, the example networked environment 100 includes one or more computing devices (e.g., client devices 102), communication service provider 104, cloud-based communication platform 106, and one or more agents 122, communicatively coupled to a communication network 112 and configured to communicate with each other through the use of the communication network 112. The cloud-based communication platform 106 includes resources 116 and an attribute-based access control system 110 (also referred to as ABAC system 110). In various embodiments, resources 116 include one or more services 118, each of which may use the ABAC system 110 to manage access control. The ABAC system is meant to be a universal system that can be used by multiple services of the communication platform 106 such that each of the services does not need to implement its own access control mechanism. In various embodiments, a communication platform 106 may include a number of products (or services 118) in a namespace. A resource may be a product, service, or feature associated with the product or service. The ABAC system may reside in the communication platform, as illustrated in FIG. 1, or may be an external system that is communicatively coupled to the communication platform 106. In various embodiments, a service includes one or more resources. In various embodiments, a service itself may be a resource. In various embodiments, a service may include one or more resources.

The communication network 112 is any type of network, including a local area network (LAN), such as an intranet, a wide area network (WAN), such as the internet, a telephone, and a mobile device network, such as a cellular network, or any combination thereof. Further, the communication network 112 may be a public network, a private network, or a combination thereof. The communication network 112 is implemented using any number of communication links associated with one or more service providers, including one or more wired communication links, one or more wireless communication links, or any combination thereof. Additionally, the communication network 112 is configured to support the transmission of data formatted using any number of protocols.

Client devices 102 can be connected to the communication network 112. A client device is any type of general computing device capable of network communication with other computing devices. For example, a client device can be a personal computing device, such as a desktop or workstation, a business server, or a portable computing device, such as a laptop, smart phone, or a tablet personal computer. A client device can include some or all of the features, components, and peripherals of machine 2200 shown in FIG. 22.

To facilitate communication with other computing devices, a client device 102 includes a communication interface configured to receive a communication, such as a request, data, and the like, from another computing device in network communication with the computing device and pass the communication along to an appropriate module running on the client device. The communication interface also sends a communication to another client device in network communication with the client device.

Although the networked environment 100 in FIG. 1 illustrates only one client device 102, one agent 122, and one communication service provider 104. This is only for ease of explanation and is not meant to be limiting. One skilled in the art would appreciate that the networked environment 100 can include any number of client devices 102, agents 122, and communication service provider 104. Further, each communication service provider 104 may concurrently interact with any number of client devices 102 and agents 122, and support connections from a variety of different types of client devices 102, such as desktop computers, mobile computers, mobile communications devices, e.g., mobile phones, smart phones, tablets, smart televisions, set-top boxes, and/or any other network-enabled computing devices. Hence, the client devices 102 may be of varying types, capabilities, operating systems, and so forth.

A user interacts with the communication service provider 104 via a client-side application 114 installed on the client device 102. In some embodiments, the client-side application 114 includes a component specific to the communication service provider 104. For example, the component may be a stand-alone application, one or more application plug-ins, and/or a browser extension. However, the users may also interact with the communication service provider 104 via a third-party application, such as a web browser or messaging application, which resides on the client devices 102 and is configured to communicate with the communication service provider 104. In either case, the client-side application presents a user interface (UI) for the user to interact with the communication service provider 104. For example, the user interacts with the communication service provider 104 via a client-side application integrated with the file system or via a webpage displayed using a web browser application.

A user may also interact with communication platform 106 via the client-side application 114 installed on the client devices 102. In some embodiments, the client-side application includes a component specific to the communication platform 106. For example, the component may be a stand-alone application, one or more application plug-ins, and/or a browser extension. In various embodiments, the user may also interact with the communication platform 106 via console interface provided by the communication platform 106, such as a web browser or messaging application configured to communicate with the communication platform 106. In either case, the client-side application presents a user interface (UI) for the user to interact with the communication platform 106.

A user (or a customer) may interact with the cloud-based communication platform 106 via an API interface or a console interface provided by the communication platform 106.

In various embodiments, a communications service provider 104 provides call center services to facilitate voice and data communications between users of client devices 102 and agents 122. In various embodiments, the communication service provider 104 may be a service included in services 118 within the cloud-based communication platform. The communication service provider 104 may include one or more resources 116. Agents 122 may work for a plurality of companies that use the services of the communications service provider 104. The users of client devices 102 may establish video and voice conversations to communicate with the agents 122, such as for requesting support for a product or service. The users of client devices 102 and agents 122 communicate with the communications service provider 104 via direct connections or a communication network 112, such as the internet or a private network connection.

In various embodiments, the communication service provider 104 may be external to the cloud-based communication platform 106. In such a scenario, the conversation manager 124 and conversation database 120 may reside within the cloud-based communication platform 106.

In various embodiments, when a user of a client device 102 requests a video or voice communication with a company, the communications service provider 104, via a communication router 108, routes the video or voice communications to an agent 122 from that company. When an agent 122 initiates the call, a conversation manager 124 routes the call to the user of the client device 102. During a conversation, the conversation manager 124 records the conversations (e.g., voice data) in a conversations database 120 of the communications service provider 104. Additionally, the communications service provider 104 includes a video processor (not shown) that processes video calls, a voice processor (not shown) that processes voice calls.

The conversation manager 124 manages the conversations, such as establishing, monitoring, and terminating conversations and managing the storage of conversation data when requested by a user of a client device 102. The user (or customer) may use the conversation data to manage, monitor, and improve operations, such as to monitor for compliance by an agent or to determine when a follow-up call is requested to further a sales process. In various embodiments, a user of client device 102 sends a request to the communication service provider 104 to provide access to resources, such as conversation data that includes recordings of voice or video calls. In various embodiments, each recording is associated with a transcript of a conversation.

FIG. 2 depicts a block diagram 200 illustrating an example attribute-based access control system for managing access to resources, according to various example embodiments. For some embodiments, the attribute-based access control system 204 represents an example of the attribute-based access control system 110 described with respect to FIG. 1. As shown, the attribute-based access control (ABAC) system 204 comprises a request receiving component 210, an access control policy identifying component 220, a metadata retrieving component 230, an access determining component 240, and an access providing component 250. According to various embodiments, one or more of the request receiving component 210, the access control policy identifying component 220, the metadata retrieving component 230, the access determining component 240, and the access providing component 250 are implemented by one or more hardware processors 202.

The request receiving component 210 is configured to receive requests for providing access to resources in a communication platform. A request can be sent from an identity, such as a person or an application user. In various embodiments, a request may be received via a gateway, such as a console interface or an API interface provided by the cloud-based communication platform 106.

The access control policy identifying component 220 is configured to identify one or more attribute-based access control policies associated with the resource. In various embodiments, the ABAC system identifies one or more attribute-based access control policies that match the request. For example, the access control policy identifying component 220 can be configured to generate a graph representing one or more granted access control policies associated with the identity and/or resource of the request. The access control policy identifying component 220 can be configured to traverse the graph to identify the one or more attribute-based access control policies that match the request.

The metadata retrieving component 230 is configured to retrieve metadata (also referred to as resource metadata) from a cache. The metadata is associated with the resource that is being requested. In various embodiments, an API call can be made to a service (e.g., resource metadata service) to retrieve such metadata. The API call can include the resource type identifier (e.g., calls, voice.calls) and/or the resource identifier (e.g., CR123). In various embodiments, if the metadata retrieving component 230 determines that the resource metadata is not stored in the cache, or for some other reasons that cannot be retrieved from the cache, the metadata retrieving component 230 can be configured to transmit an API call (e.g., a further API call) to retrieve the resource metadata from a system of record where the resource can be read.

The access determining component 240 is configured to determine the access to the resource, including evaluating a predicate included in the attribute-based access control policy based on the resource metadata. An attribute-based access control policy can be represented by (or can include) a text string that includes a namespace identifier, a product identifier, a resource identifier, an action identifier, and a predicate. A predicate can be a Boolean-valued function composed of one or more conditions of a form, including a predicate operator (e.g., >, <, ==), and its operands. In various embodiments, upon retrieving the resource metadata, access determining component 240 is configured to use a mapping function to convert the resource metadata into a generic resource-metadata object. The access determining component 240 is configured to use the generic resource-metadata object to determine whether a condition provided in the predicate is satisfied. A predicate function returns a true value if a condition is satisfied, indicating a match. Otherwise, the predicate function returns a false value.

The access providing component 250 is configured to provide the access to the resource based on the determining of the access, in response to receiving the request. Specifically, upon authorizing the request, the access providing component 250 is configured to generate a token to pass one or more attribute-based access control policies to one or more downstream services associated with the resource to provide the relevant access. In various embodiments, the access providing component 250 is configured to sign the token before passing the token to the one or more downstream services. In various embodiments, a token can be signed using a digital signature algorithm (e.g., Edwards-curve Digital Signature Algorithm).

Figure 3:
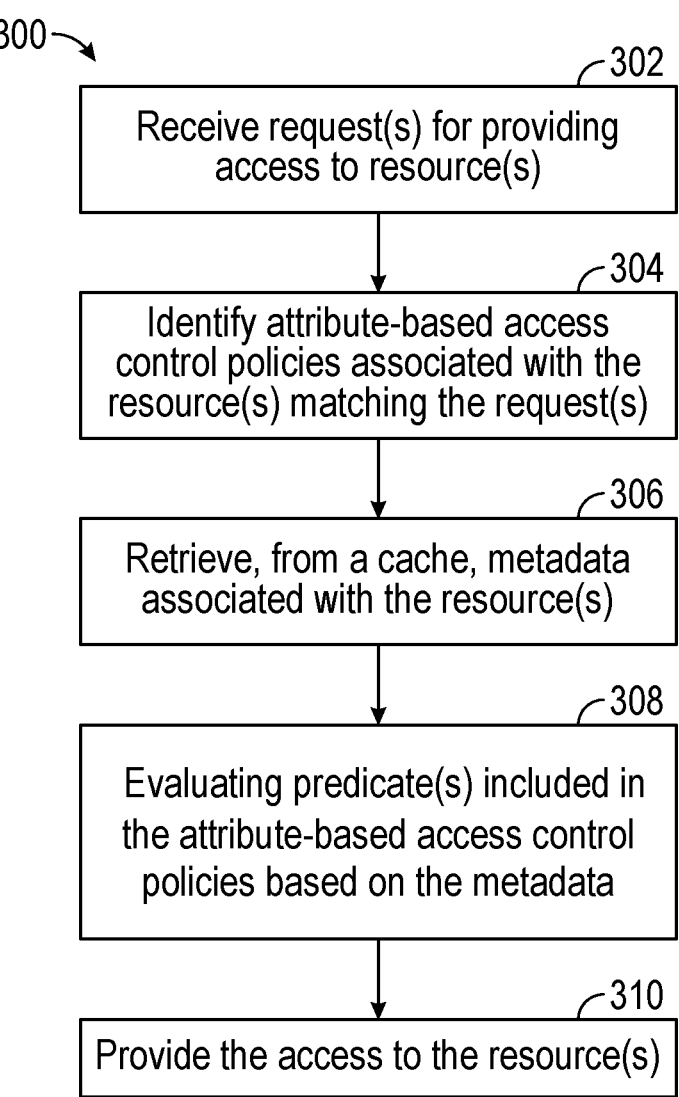
FIG. 3 depicts a flowchart illustrating an example method for managing access to resources using attribute-based access control by an example attribute-based access control system during operation, according to various example embodiments.

FIG. 3 depicts a flowchart illustrating an example method 300 for managing access to resources using attribute-based access control by an example attribute-based access control system during operation, according to various example embodiments. It will be understood that example methods described herein may be performed by a machine in accordance with some embodiments. For example, method 300 can be performed by the ABAC system 110 described with respect to FIG. 1, and the ABAC system 204 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, the processor receives one or more requests for providing access to one or more resources in a communication platform. A request can be sent from an identity, such as a person or an application user. In various embodiments, a request may be received via a gateway, such as a console interface or an API interface provided by the cloud-based communication platform 106. A request may be an API request that is associated with a Universal Resource Identifier ("URI"), and may be generated via a call to an API of the ABAC system 110 by one or more downstream systems or services described herein. In various embodiments, the request may be responsive to a detection of an attempt by a user (e.g., via client-side application 114 and/or client device 102) or a request received from the user at one or more downstream systems or services to access the one or more resources.

At operation 304, the processor identifies one or more attribute-based access control policies associated with the resource. In various embodiments, the processor identifies one or more attribute-based access control policies that match the request. For example, the processor can generate a graph that represents one or more granted access control policies associated with the identity of the request. The processor can traverse the graph to identify the one or more attribute-based access control policies that match the request.

At operation 306, the processor retrieves metadata (also referred to as resource metadata) from a cache. The metadata is associated with the resource that is being requested. In various embodiments, an API call can be made to a service (e.g., resource metadata service) to retrieve such metadata. The API call can include the resource type identifier (e.g., calls, voice.calls, etc.) and/or the resource identifier (e.g., CR123). In various embodiments, if the processor determines that the resource metadata is not stored in the cache, or for some other reasons that cannot be retrieved from the cache, the processor transmits one or more API calls to retrieve the resource metadata from one or more systems of record where the resource can be read.

At operation 308, the processor determines the access to the resource, including evaluating a predicate included in the attribute-based access control policy based on the resource metadata. An attribute-based access control policy can be represented by (or can include) a text string that includes a namespace identifier, a product identifier, a resource identifier, an action identifier, and a predicate. In various embodiments, upon retrieving the resource metadata, the processor can use a mapping function to convert the retrieved resource metadata into one or more generic resource-metadata objects. The processor can use the one or more generic resource-metadata objects to determine whether one or more conditions provided in the predicate are satisfied. A predicate function returns a true value if a condition is satisfied, indicating a match. Otherwise, the predicate function returns a false value.

At operation 310, the processor provides access to the resource based on determining the access, in response to receiving the request. Specifically, upon authorizing the request, the processor generates a token to pass one or more attribute-based access control policies to one or more downstream services associated with the resource to provide the relevant access. In various embodiments, the processor signs (or causes to sign) the token before passing the token to the one or more downstream services. In various embodiments, a token can be signed using a digital signature algorithm (e.g., Edwards-curve Digital Signature Algorithm).

Though not illustrated, method 300 can include an operation where a graphical user interface for managing access to computing resources can be displayed (or caused to be displayed) by the hardware processor. For instance, the operation can cause a client device (e.g., the client device 102 communicatively coupled to the ABAC system 110) to display the graphical user interface for managing access to computing resources. This operation for displaying the graphical user interface can be separate from operations 302 through 310 or, alternatively, form part of one or more of operations 302 through 310. In various embodiments, the graphical user interface may be caused to be generated and presented (e.g., on client device 102) based on return values received from calls to the API of the ABAC system 110, such as return values indicating one or more actions or whether permissions to access one or more resources are to be granted.

FIG. 4 depicts a flowchart illustrating another example method 400 for managing access to resources using attribute-based access control by an example attribute-based access control system during operation, according to various example embodiments. It will be understood that example methods described herein may be performed by a machine in accordance with some embodiments. For example, method 400 can be performed by the ABAC system 110 described with respect to FIG. 1, and the ABAC system 204 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In various embodiments, one or more operations of method 400 may be a sub-routine of one or more of the operations of method 300. In various embodiments, one or more operations in method 400 may be performed subsequent to the operations of method 300.

At operation 402, the processor transmits or can use a proxy (e.g., a cached proxy) to transmit one or more API calls to retrieve the metadata associated with the resource (also referred to as resource metadata) from a cache.

At operation 404, the processor determines that the resource metadata cannot be retrieved from the cache due to various reasons. An example reason can be that metadata is not stored in the cache, and/or that the cache is unresponsive or unavailable due to various issues (e.g., system latency, connection failure).

At operation 406, the processor transmits one or more further API calls to retrieve the resource metadata from one or more systems of record where the resource can be read.

At operation 408, the processor uses a mapping function to convert the resource metadata into one or more generic resource-metadata objects.

At operation 410, the processor uses the one or more generic resource-metadata objects to determine whether one or more conditions provided in one or more predicates can be satisfied.

In various embodiments, metadata can be data that describes one or more attributes of a resource. An example resource metadata (or attribute) of a resource may be the type, ownership, discoverability, documentation, evaluation, selection, location, or size of the resource.

Though not illustrated, method 400 can include an operation where a graphical user interface for managing access to computing resources can be displayed (or caused to be displayed) by the hardware processor. For instance, the operation can cause a client device (e.g., the client device 102 communicatively coupled to the ABAC system 110) to display the graphical user interface for managing access to computing resources. This operation for displaying the graphical user interface can be separate from operations 402 through 410 or, alternatively, form part of one or more of operations 402 through 410.

Figure 5:
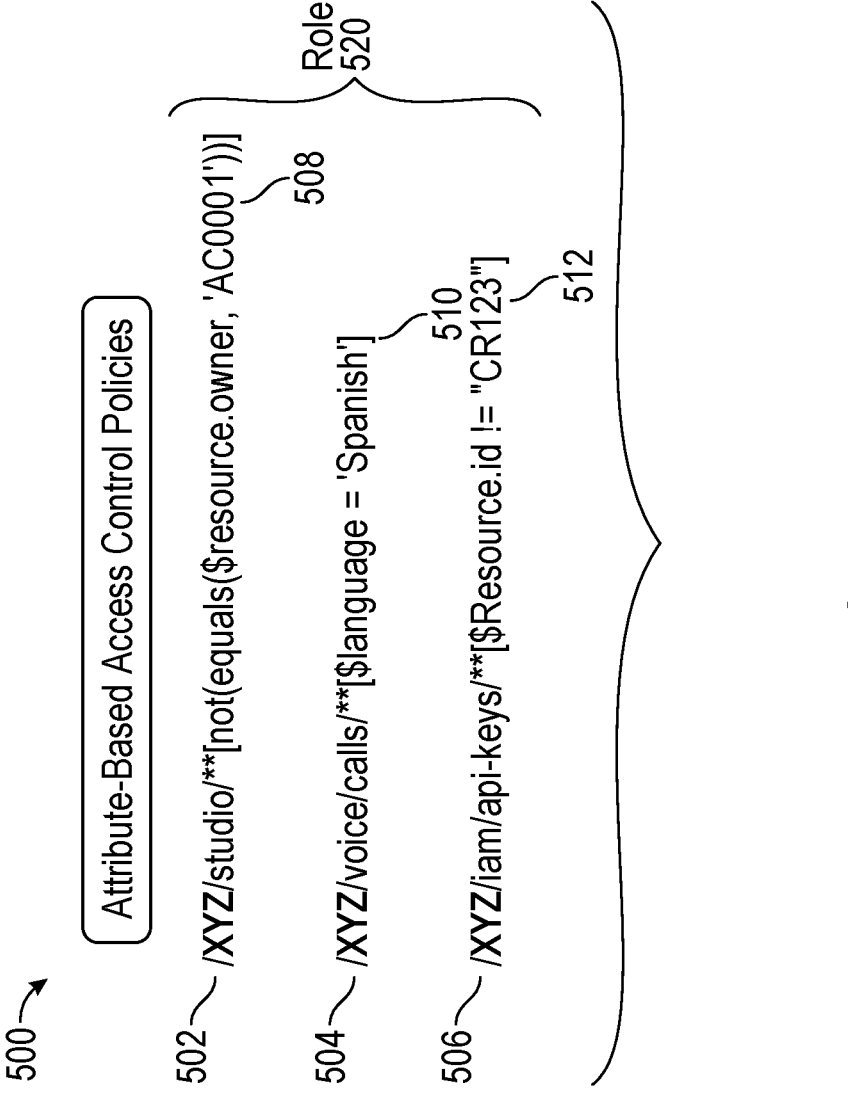
FIG. 5 depicts a block diagram illustrating an example set of attribute-based access control policies, according to various example embodiments.

FIG. 5 depicts a block diagram 500 illustrating an example set of attribute-based access control policies, according to various example embodiments. As shown, role 520 includes a set of attribute-based access control policies, including policies 502, 504, and 506. Policy 506, similar to policies 502 and 504, is represented by a text string that includes a namespace identifier "XYZ," a product identifier "iam," a resource identifier "api-keys," and an action identifier "**\*\*," indicating all allowed actions (e.g., read, create, update, delete, list, or do) on the resource. A namespace may refer to a service provider of the cloud-based communication platform 106, or the communication service provider 104, as illustrated in FIG. 1**.

As illustrated in FIG. 5, predicate 508 of policy 502 is [not(equals($Resource.owner, 'AC0001'))], indicating permissions can be granted for all "studio" resources except for ones owned by resource owner "AC0001." Predicate 510 of policy 504 is [$language=='Spanish'], indicating permissions granted for all "calls" resources provided that the language is in Spanish. Predicate 512 of policy 506 is [$Resource.id !="CR123"], indicating permissions granted for all "api-keys" resources provided that the resource ID is not equal to the value "CR123."

FIG. 5 is merely a non-limiting example of attribute-based access control policies (also referred to as attribute-based permissions). It is appreciated that many other attribute-based permissions can be implemented based on the same or similar format to facilitate the functionality described herein.

Figure 6:
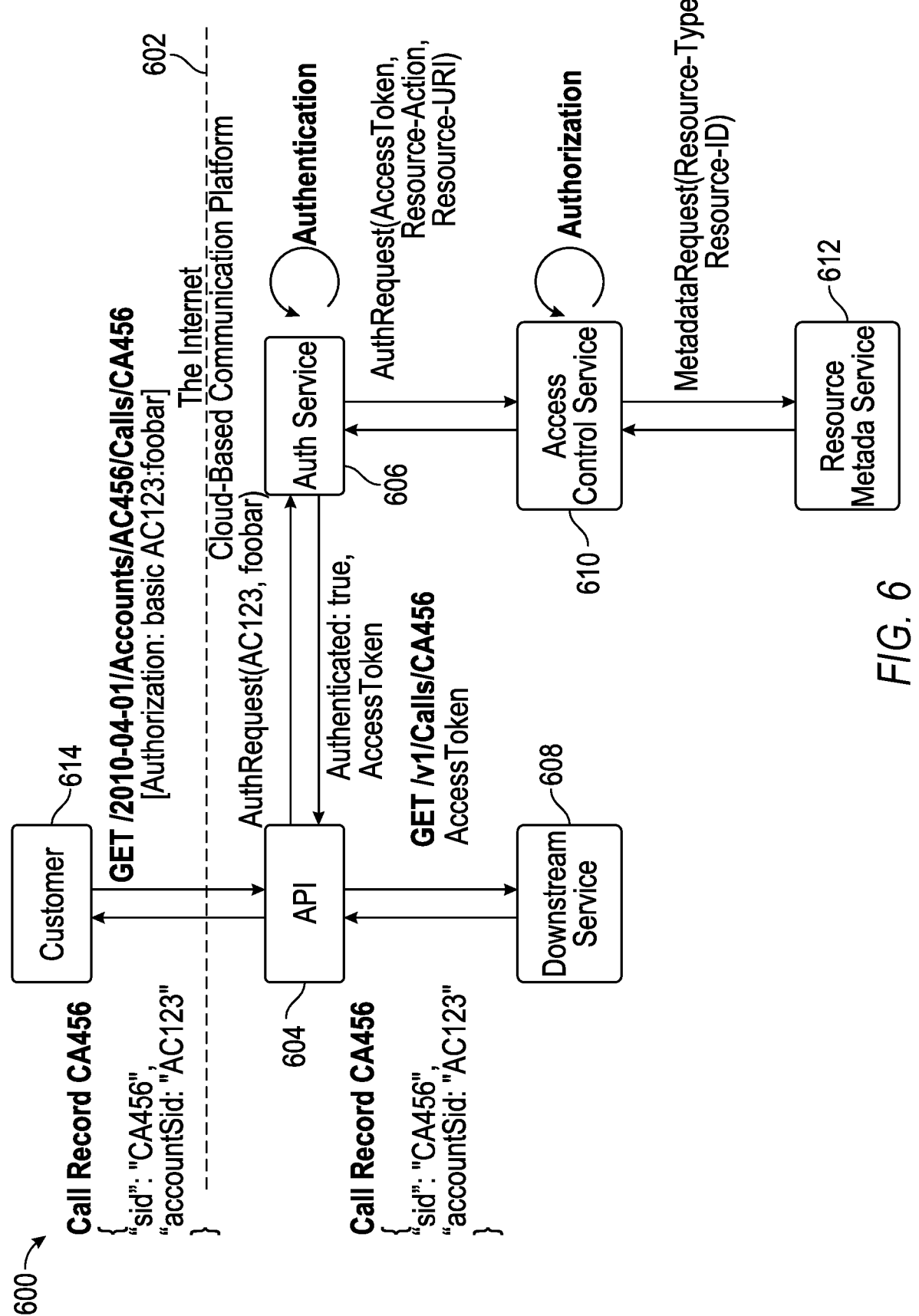
FIG. 6 depicts a block diagram illustrating data flow within an example networked environment in which the disclosed technology may be practiced, according to various example embodiments.

FIG. 6 depicts a block diagram 600 illustrating data flow within an example networked environment in which the disclosed technology may be practiced, according to various example embodiments. As shown, the cloud-based communication platform 602 can correspond to the cloud-based communication platform 106 described in FIG. 1. The cloud-based communication platform 602 includes an API 604, an authentication service 606, one or more downstream services 608, an access control service 610, and a resource metadata service 612. A service can correspond to one or more components described herein. The ABAC system 110 described with respect to FIG. 1, the ABAC system 204 described with respect to FIG. 2, and/or individual components thereof can include one or more services described in FIG. 6.

In various embodiments, customer 614 (or an identity described herein) transmits one or more requests (e.g., resource-accessing requests) via the API 604 to the authentication service 606. The authentication service 606 can authenticate the one or more requests and communicate with the access control service 610 for access control authorization. The access control service 610 communicates with the resource metadata service 612 to retrieve metadata (e.g., resource metadata), based on which access control authorizations can be performed using the access control policies described herein. Access can be provided based on the results of the authentication of the requests and the authorization of the access. Access tokens, such as serialized tokens, can be generated in the process of providing the requested access.

Role-Based Access Control System for Managing Access to Resources

Various embodiments include systems, methods, and non-transitory computer-readable media for generating and managing access to resources using role-based access control. When receiving a request to provide access to a resource in a communication platform (e.g., via a console interface or an API interface), a role-based access control (RBAC) system uses a Uniform Resource Identifier (URI) analyzing component to analyze the request and classifies the URI into a permission. A permission is an authorization granted to an identity (e.g., a user, an application, or a credential, such as an API Key) to perform an action on a resource specified in the permission. A permission may be represented by a text string that includes four parts: namespace, product name, resource name, and the type of action. Each of these parts is an identifier separated by a "/," such as /namespace/product name/resource name/action. For example, a permission to make a phone call can be represented by a text string "/entity/product/call/create." A text string may correspond to an assertion that maps to one or more URIs.

A resource is associated with a public URI and method (e.g., GET, PUT, POST, DELETE). The communication platform may register multiple URIs for a single permission and may register multiple permissions for a single role. Once a permission is granted, the user may perform the action on the particular resource associated with the product and namespace (e.g., an entity) specified in the permission. Actions configured to be performed on resources may include, for example, read, create, update, delete, list, and do.

In various embodiments, a role may be created for or assigned to an identity to include one or more permissions. In various embodiments, a user may be a person, or a group of people. A permission can be assigned to an application (e.g., an application associated with an application user), or to a credential (e.g., an API Key). An application may be developed by a third party (e.g., a customer) using client-side SDK kits provided by the communication platform.

In various embodiments, if the RBAC system is unable to classify the URI into an existing permission, the RBAC system may deny the request, discard the request, or redirect the request to a system communicatively coupled to the communication platform for handling.

In various embodiments, the RBAC system generates a graph, such as a tree structure, of all the permissions the user has been granted, and traverses the graph to match the classified permission with a permission included in the graph, such as the graph (also referred to as assertion tree) illustrated in FIG. 6. If the RBAC system determines there is a match, the request will be granted. Otherwise, the request will be denied. In various embodiments, the assertion tree may be generated at run time and dynamically updated at run time. For example, once an assertion tree is generated at run time, it may be stored in volatile computer memory (e.g., cache memory) for a limited time period, as a user is likely to request access to resources again shortly after making the first request. In various embodiments, a session may be initiated once a request is authorized for an identity (e.g., a user, an application, or a credential). The graph may be temporarily stored in cache memory for the duration of the session.

In various embodiments, the RBAC system causes a display of a user interface, including an indication of authorization status indicating whether the request is granted. For example, the indication of authorization status may be a selectable user interface element (e.g., a window or an icon) notifying the user the request is allowed or denied. In some examples, if the request is granted, the RBAC system may cause the requested resource to be accessible to the requesting user (e.g., displaying the resource in the user interface) or cause the action specified in the permission to be automatically executed (e.g., deleting the resource specified in the request).

In various embodiments, the RBAC system may receive a request to assign a role (e.g., a customized role) to an identity. The role is associated with a list of permissions. The RBAC system may match the list of permission specified in the request to existing permissions available on the communication platform and generate the role for the identity by associating the list of permissions with an identity. In various embodiments, the RBAC system provides existing permissions available on the communication platform to a customer so that the customer can create a role that can be assigned to an identity. This assignment may associate the list of permissions included in a role with the identity for access within a scope of resources.

In various embodiments, a communication platform may include a number of products in the namespace. A resource may be a product, or a feature associated with a product, such as a phone number, a call record, a studio flow, or a message. The RBAC system may reside in the communication platform, as illustrated in FIG. 1, or may be an external system that is communicatively coupled to the communication platform.

In various embodiments, a request may be an API request that can be authorized using an API key. An API request occurs when an identity (e.g., a user or an application) makes a call to a server using an API endpoint. An API endpoint refers to a touchpoint of an interaction between an API and a system. An API endpoint provides the location where an API accesses a resource.

In various embodiments, a permission can register multiple URIs to accommodate multiple interfaces and system versions that can be used to access the resource, e.g., public API endpoints, console, SDK, etc.

Reference will now be made in detail to embodiments of the present disclosure, examples of which are illustrated in the appended drawings. The present disclosure may, however, be embodied in many different forms and should not be construed as being limited to the embodiments set forth herein.

Figure 7:
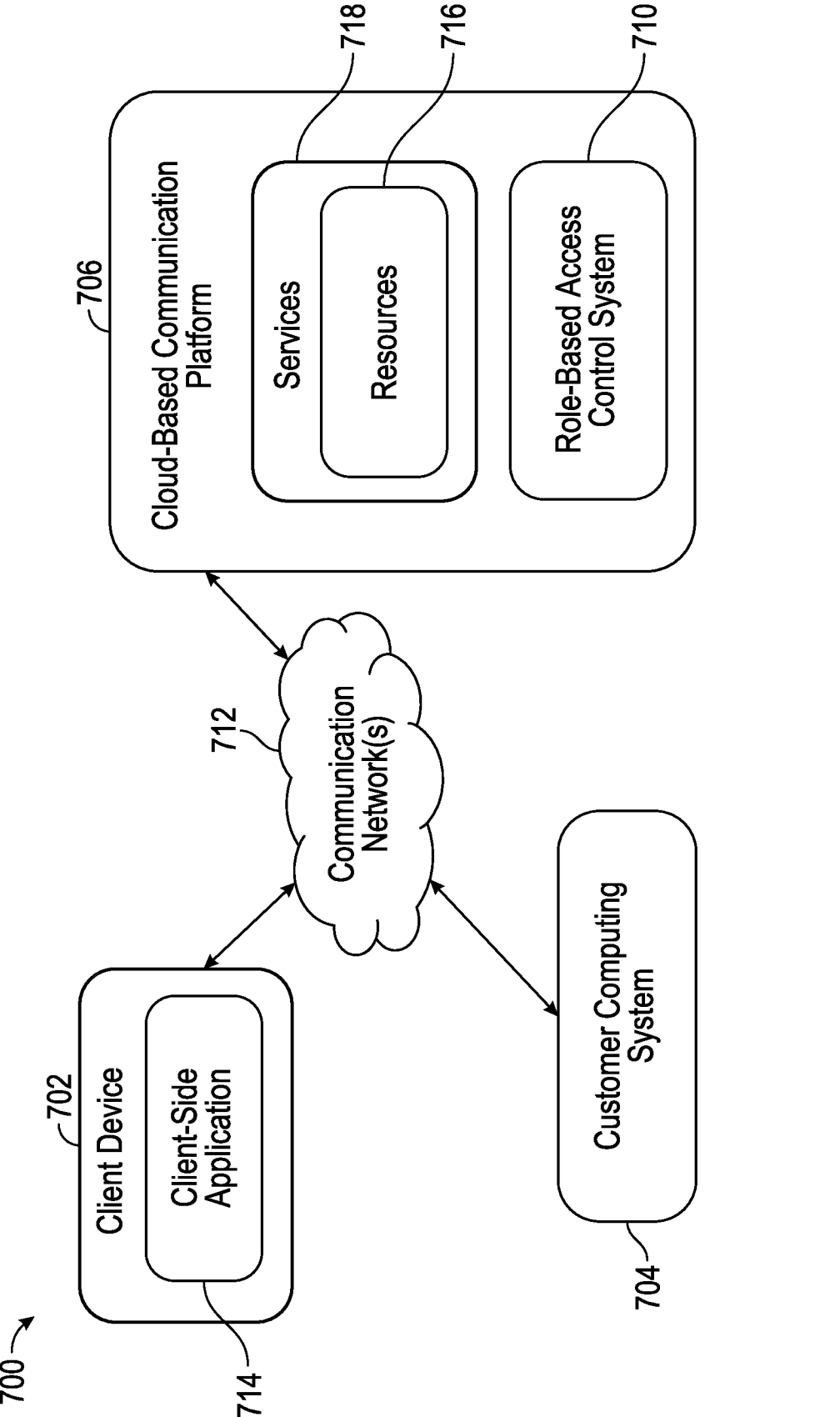
FIG. 7 depicts a block diagram showing an example networked environment in which the disclosed technology may be practiced, according to various example embodiments.

FIG. 7 depicts a block diagram showing an example networked environment 700 in which the disclosed technology may be practiced, according to various example embodiments. As shown in FIG. 7, the example networked environment 700 includes multiple computing devices (e.g., client device 702), customer computing system 704, and cloud-based communication platform 706 communicatively coupled to a communication network 712 and configured to communicate with each other through the use of the communication network 712. The cloud-based communication platform 706 includes resources 716 and a role-based access control system 710 (also referred to as RBAC system 710). In various embodiments, services 718 host or include one or more resources 716. A service may use the RBAC system

710 to manage access control. The RBAC system is meant to be a universal system that can be used by multiple services of the communication platform 706 such that each of the services does not need to implement its own access controls.

The communication network 712 is any type of network, including a local area network (LAN), such as an intranet, a wide area network (WAN), such as the internet, a telephone and mobile device network, such as cellular network, or any combination thereof. Further, the communication network 712 may be a public network, a private network, or a combination thereof. The communication network 712 is implemented using any number of communication links associated with one or more service providers, including one or more wired communication links, one or more wireless communication links, or any combination thereof. Additionally, the communication network 712 is configured to support the transmission of data formatted using any number of protocols.

Multiple computing devices can be connected to the communication network 712. A computing device is any type of general computing device capable of network communication with other computing devices. For example, a computing device can be a personal computing device such as a desktop or workstation, a business server, or a portable computing device, such as a laptop, smart phone, or a tablet personal computer. A computing device can include some or all of the features, components, and peripherals of the machine 2200 shown in FIG. 22.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The customer computing system 704 is one or more computing devices associated with a customer of the cloud-based communication platform 706 (also referred to as communication platform 706). A customer may be a business, a company, and/or any other type of entity that uses the services provided by communication platform 706. The customer may provide any type of service, such as a banking service, travel service, retail service, and the like. The service may be an online and/or offline service. That is, the service may be available only online, such as an online retailer, offline, such as a physical retailer, or both online and offline, such as a retailer that provides a website or application as well as a physical retail store.

The customer computing system 704 may facilitate any service of a customer that is provided online. In various embodiments, users of client devices 702 may interact with the customer computing system 704 via communication network 712 to utilize the online service provided by the customer. The customer computing system 704, however, does not have to provide an online service that is accessible to users. That is, the customer computing system 704 may simply be a computing system used by a customer to perform any type of functionality. In various embodiments, a user of a client device 702 may be a person or a group of people. A user may send requests to access certain resources on the communication platform 706. A customer of the customer computing system 704 may be a business, company, and/or any other type of entity that develops applications using client-side SDK kits provided by the communication platform 706. The application (also referred to as application user) may send requests to access certain resources on the communication platform 706.

Although the networked environment 700 in FIG. 7 illustrates only one client device 702, and one customer computing system 704, this is only for ease of explanation and is not meant to be limiting. One skilled in the art would appreciate that the networked environment 700 can include any number of client devices 702, and/or customer computing systems 704. Further, each customer computing system 704 may concurrently interact with any number of client devices 702, and support connections from a variety of different types of client devices 702, such as desktop computers, mobile computers, mobile communications devices, e.g., mobile phones, smart phones, tablets; smart televisions, set-top boxes, and/or any other network-enabled computing devices. Hence, the client devices 702 may be of varying types, capabilities, operating systems, and so forth.

A user interacts with a customer computing system 704 via a client-side application 714 installed on the client devices 702. In some embodiments, the client-side application 714 includes a component specific to the customer computing system 704. For example, the component may be a stand-alone application, one or more application plug-ins, and/or a browser extension. However, the users may also interact with the customer computing system 704 via a third-party application, such as a web browser or messaging application, that resides on the client devices 702 and is configured to communicate with the customer computing system 704. In either case, the client-side application presents a user interface (UI) for the user to interact with the customer computing system 704. For example, the user interacts with the customer computing system 704 via a client-side application integrated with the file system or via a web page displayed using a web browser application.

A user may also interact with communication platform 706 via the client-side application 714 installed on the client devices 702. In some embodiments, the client-side application includes a component specific to the communication platform 706. For example, the component may be a stand-alone application, one or more application plug-ins, and/or a browser extension. In various embodiments, the user may also interact with the communication platform 706 via console interface provided by the communication platform 706, such as a web browser or messaging application configured to communicate with the communication platform 706. In either case, the client-side application presents a user interface (UI) for the user to interact with the communication platform 706.

A user or a customer may interact with communication platform 706 via an API interface or a console interface provided by the communication platform 706.

A customer may use a customer computing system 704 to cause transmission of communication messages (e.g., SMS messages) to intended recipients. For example, a customer computing system 704 may provide online functionality that enables users of the customer computing system 704 to transmit messages to agents of the customer and/or other users. As another example, the customer computing system 704 may transmit messages to users to provide the users with two-factor authentication, password resets, updates, links to content, promotions, etc.

Figure 8:
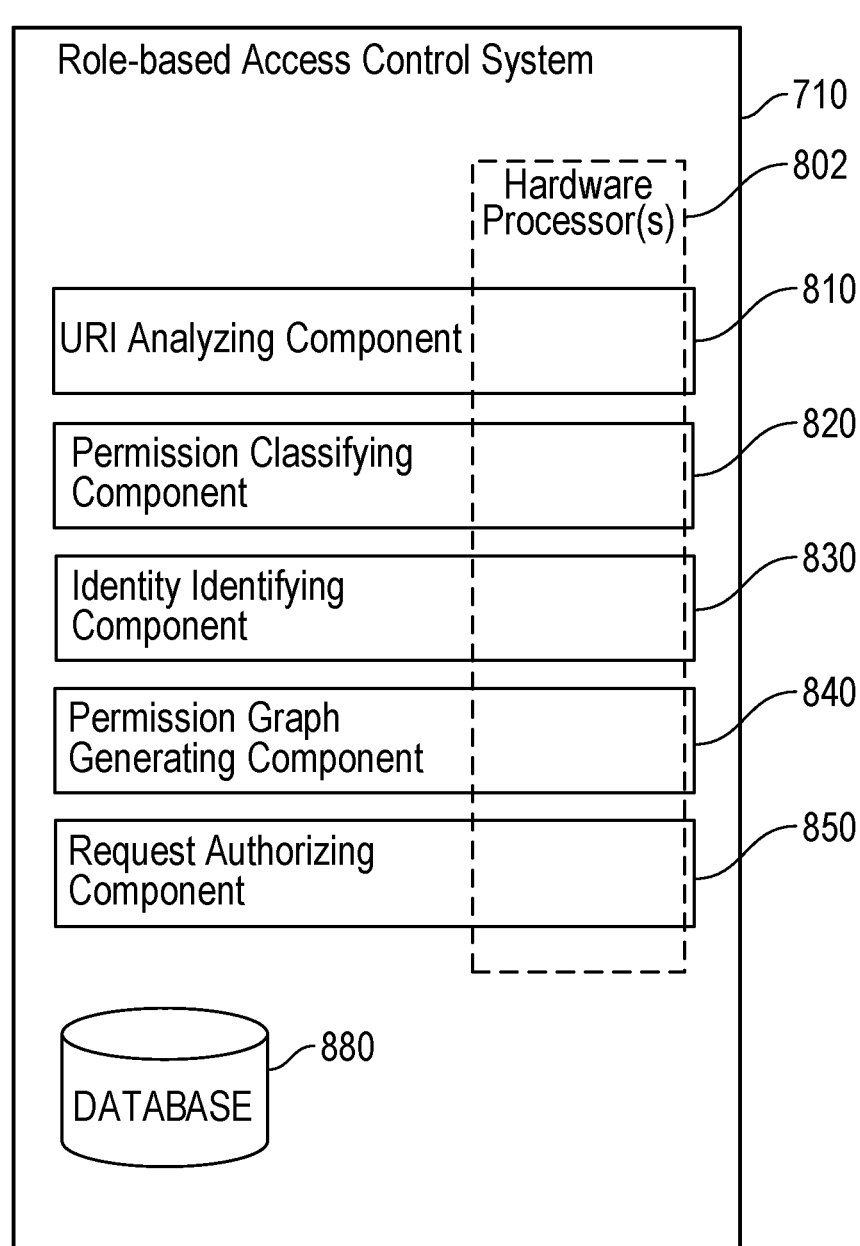
FIG. 8 depicts a block diagram illustrating an example role-based access control system for managing access to resources, according to various example embodiments.

FIG. 8 depicts a block diagram 800 illustrating an example role-based access control system for managing access to resources, according to various example embodiments. For some embodiments, the role-based access control system 710 represents an example of the role-based access control system 710 described with respect to FIG. 7. As shown, the role-based access control (RBAC) system 710 comprises a URI analyzing component 810, a permission classifying component 820, an identity identifying component 830, a permission graph generating component 840, and a request authorizing component 850.

The URI analyzing component 810 is configured to receive a request to provide access to one or more resources on the communication platform 706. In various embodiments, the request may be associated with a URI. The URI analyzing component 810 is configured to analyze the URI to break it down to a format that can be mapped to an existing permission.

Figure 11:
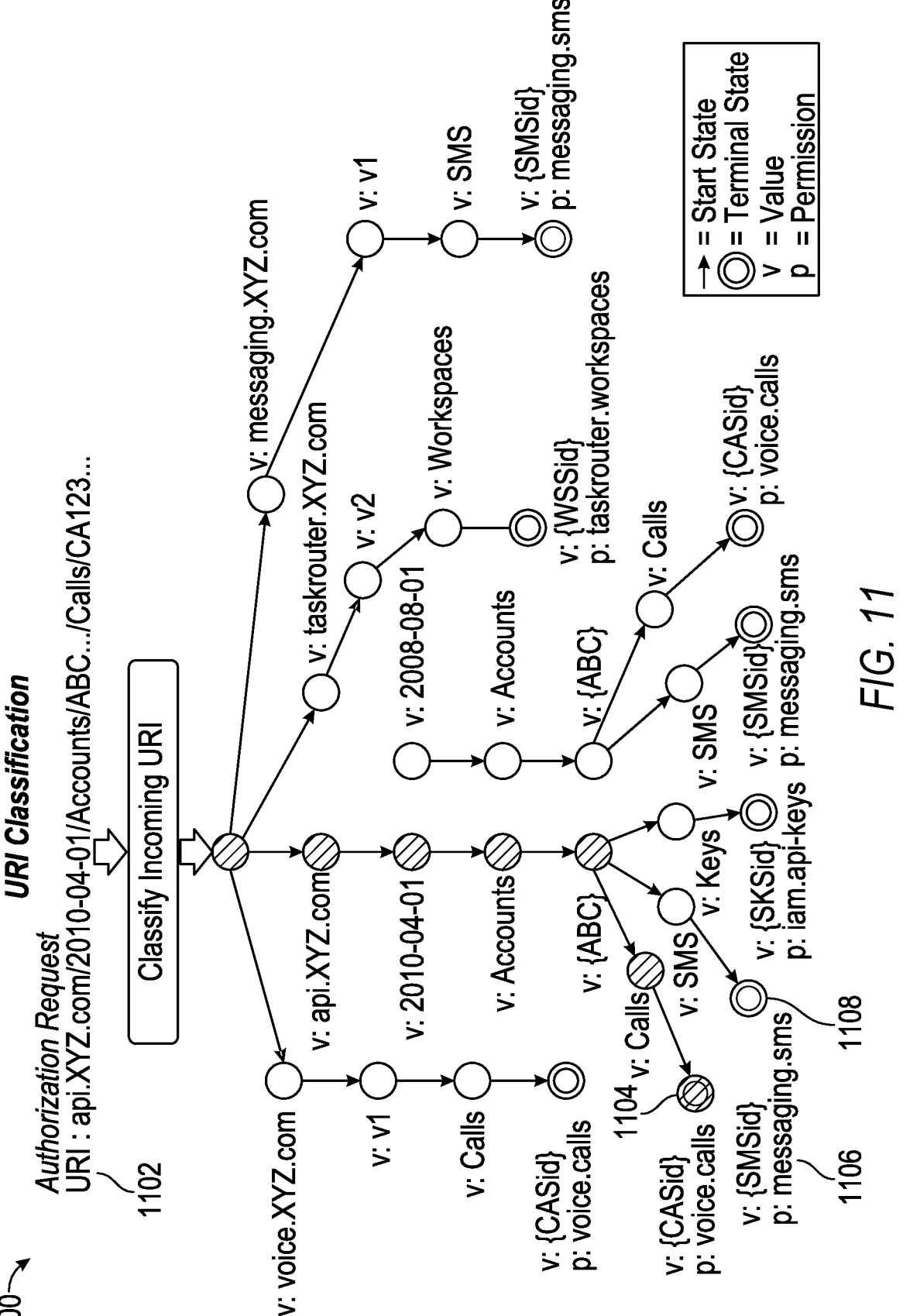
FIG. 11 depicts a block diagram showing an exemplary tree structure illustrating an example URI classifier, according to various example embodiments.

The permission classifying component 820 is configured to classify the URI into a permission (e.g., first permission) that allows the access to a resource on the communication platform 706. In various embodiments, the permission classifying component 820 may construct a tree structure that includes a number of nodes, as illustrated in FIG. 11. The tree structure may also be referred to as a URI classifier. One or more permissions may be identified based on the URI classifier. Each node represents a part (or a portion) of a URI, such as URI 1102, as illustrated in FIG. 11, and is organized based on a URI template. A leaf node (e.g., leaf node 1108) represents a classified permission (e.g., permission 1106). A permission is represented by a text string that includes a plurality of identifiers, including a namespace identifier, a product identifier, a resource identifier, and an action identifier. In various embodiments, A URI-classifier may be created or updated every time a change occurs to any URI templates mapped to a permission.

The identity authentication component 830 is configured to identify the identity (e.g., a user, an application, or a credential, such as an API key) associated with the request. In various embodiments, the RBAC system uses identity identifying component 830 to identify the identity associated with the request before analyzing the URI via the URI analyzing component 810. The identity may be associated with one or more granted permissions. A user may be a person, or a group of people. A user may be assigned multiple roles. Each role may be associated with one or more permissions to access one or more resources on the communication platform 706.

Figure 12:
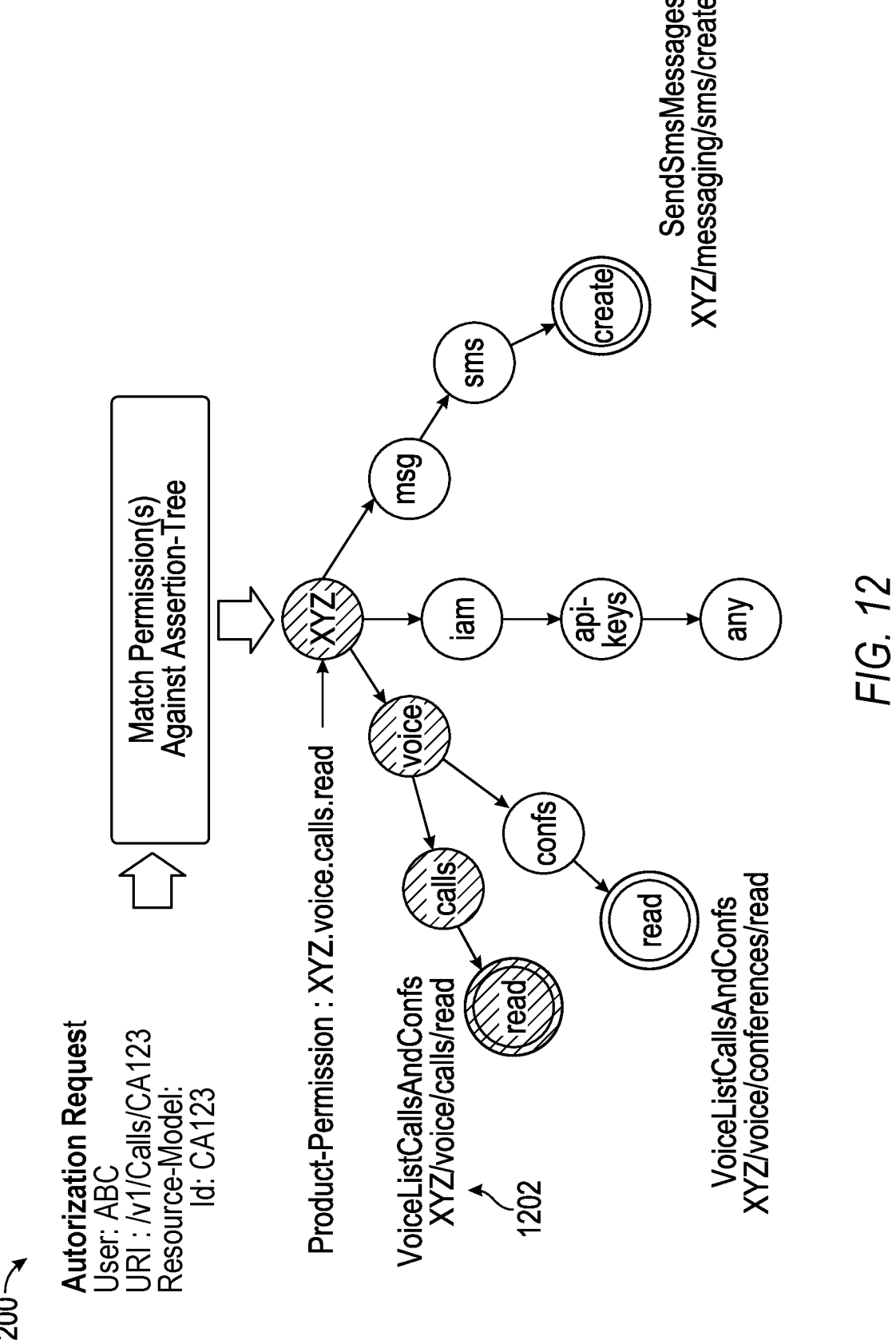
FIG. 12 depicts a block diagram illustrating an example assertion tree, according to various example embodiments.

The permission graph generating component 840 may be configured to identify permissions associated with the identity and generate a graph (e.g., assertion tree) representing the one or more granted permissions associated with the identity at runtime. A graph, as illustrated in FIG. 12, may also be referred to as an assertion tree, representing a number of granted permissions associated with an identity. A graph, once generated, may be stored in volatile computer memory (e.g., cache memory) for a limited time period, as an identity, such as a user, is likely to make another request again shortly after making the first one. In various embodiments, a session may be initiated once a request is authenticated for the identity (e.g., a user, an application, or a credential). The graph may be temporarily stored in cache memory for the duration of the session.

The request authorization component 850 may be configured to authorize the request (e.g., an API request), including traversing the graph to determine that the permission is included in the one or more granted permissions. As illustrated in FIG. 11, permission 1106 (i.e., /XYZ/voice/calls/read) is identified from the graph, indicating user, "ABC", has been granted the permission to "read" the resource "calls" for product "voice" that is associated with namespace "XYZ." A namespace may refer to a service provider of the cloud-based communication platform 706.

FIG. 9 depicts a flowchart illustrating an example method 900 for managing access to resources by an example role-based access control system 710 during operation, according to various example embodiments. It will be understood that example methods described herein may be performed by a machine in accordance with some embodiments. For example, method 900 can be performed by the RBAC system 710 described with respect to FIG. 7 and FIG. 8, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 900 may be represented by executable instructions that, when executed by a processor of a computing device, cause the computing device to perform method 900. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 902, the processor receives a request to provide access to one or more resources on the communication platform 706. The request may be an API request that is associated with a URI.

At operation 904, the processor identifies an identity associated with the request. The identity may be associated with one or more granted permissions. A user (e.g., a person, a group of people, or an application user) may be associated with the identity. An identity may be assigned multiple roles. Each role may be associated with one or more permissions to access one or more resources on the communication platform 706.

At operation 906, the processor classifies the URI into a permission (e.g., first permission) to access a resource on the communication platform 706. In various embodiments, the processor may construct a tree structure that includes a number of nodes, as illustrated in FIG. 11. The tree structure may also be referred to as a URI classifier. Each node represents a part of a URI, such as URI 1102, as illustrated in FIG. 11, and is organized based on a URI template. The leaf node (e.g., leaf node 1108) represents a classified permission (e.g., permission 1106). The permission 1106 is associated with a unique identifier (e.g., SMSid). In various embodiments, A URI-classifier may be created or updated every time a change occurs to any URI templates mapped to a permission. In various embodiments, upon detecting a change is made to a URI template, the processor updates the associated URI classifier at run time based on the change.

At operation 908, the processor generates a graph representing the one or more granted permissions associated with the identified identity at runtime. A graph, as illustrated in FIG. 12, may also be referred to as an assertion tree, representing a number of granted permissions associated with the identity. A graph, once generated, may be stored in volatile computer memory (e.g., cache memory) for a limited time period, as a user is likely to make another request again shortly after making the first one. In various embodiments, a session may be initiated once a request is authorized for an identity (e.g., a user, an application, or a credential). The graph may be temporarily stored in cache memory for the duration of the session.

At operation 910, the processor authorizes the request (e.g., an API request), including traversing the graph (e.g., tree structure illustrated in FIG. 12) to determine that the permission is included in the one or more granted permissions for the identity. As illustrated in FIG. 12, permission 1202 (i.e., /XYZ/voice/calls/read) is identified from the graph, indicating user "ABC" has been granted the permission to "read" the resource "calls" for product "voice," associated with namespace "XYZ." In various embodiments, a valid action to be included in a permission may be "read," "create," "update," "delete," "list," or "do."

At operation 912, the processor performs the providing of the access to the resource. For example, the processor causes a display of a user interface of a device (e.g., client device 702) associated with the identified identity. The user interface includes an indication of authorization status, indicating whether the request is authorized. For example, the indication of authorization status may be a selectable user interface element (e.g., a window or an icon) notifying the user the request is allowed or denied. In some examples, depending on the type of permission or the gateway (e.g., console interface or API interface) from which a request comes in, the RBAC system may cause the requested resource to be accessible to the requesting identity (e.g., displaying the resource in the user interface) or cause the action specified in the permission to be executed automatically (e.g., deleting the resource specified in the request).

In various embodiments, the RBAC system may receive a request to assign a role to a user. The role may be associated with a list of permissions. The RBAC system may match the list of permission to existing permissions associated with resources on the communication platform 706, and generate the role for the identity, such as by associating the list of permissions with the identity.

In various embodiments, a communication platform may include a number of products in the namespace. A resource can be a part of a product, or a feature associated with a product. The RBAC system may reside in the communication platform, as illustrated in FIG. 7, or may be an external system that is communicatively coupled to the communication platform.

In various embodiments, a request may be an API request that can be authenticated using an API key. An API request occurs when an identity (e.g., a person or an application) may make a call to a server using an endpoint. An API endpoint refers to a touchpoint of an interaction between an API and a system. An API endpoint provides the location where an API accesses a resource.

In various embodiments, a permission is represented by a text string including a namespace identifier, a product identifier, a resource identifier, and an action identifier.

In various embodiments, a graph is a tree structure representing the one or more granted permissions. The one or more granted permissions correspond to a role assigned to an identity. In various embodiments, permissions may be granted to a credential or an application directly.

Though not illustrated, method 900 can include an operation where a graphical user interface for providing role-based access control can be displayed (or caused to be displayed) by the hardware processor. For instance, the operation can cause a client device (e.g., the client device 702 communicatively coupled to the RBAC system 710) to display the graphical user interface for providing role-based access control. This operation for displaying the graphical user interface can be separate from operations 902 through 912 or, alternatively, form part of one or more of operations 902 through 912.

Figure 10:
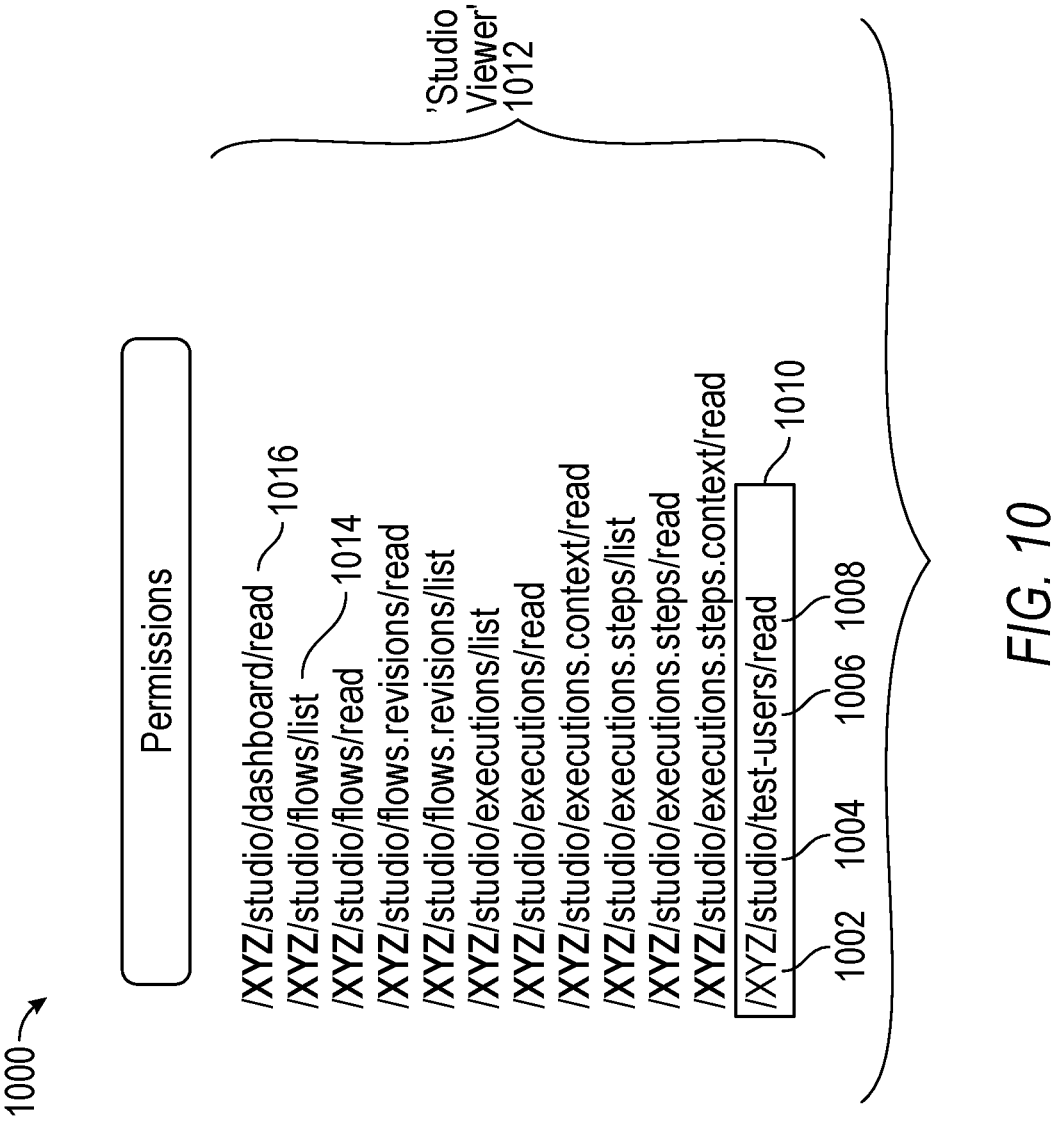
FIG. 10 depicts a block diagram illustrating an example set of permissions included in a role, according to various example embodiments.

FIG. 10 depicts a block diagram 1000 illustrating an example set of permissions included in a role, according to various example embodiments. As shown, role 1012, named "Studio Viewer," includes a set of permissions, including permission 1010. Permission 1010, similar to other permissions as illustrated in FIG. 10, is represented by a text string comprising four parts: "XYZ" as namespace identifier 1002, "studio" as product identifier 1004, "test-users" as resource identifier 1006, and "read" as action identifier 1008. A namespace may refer to a service provider of the cloud-based communication platform 706. A built-in role represents a known access pattern for a product and is offered out-of-the-box as part of the communication platform. For example, role 1012 "Studio Viewer" is a role that allows a user only to view Studio flows and not be able to edit them. As illustrated in FIG. 10, the actions associated with the list of permissions for "Studio Viewer" are limited to "read 1016" and "list 1014." A role may be a built-in role or a customized role. A built-in role may not be modifiable by a customer or a user. A customer may create and manage their own customized roles to facilitate the services it provides.

FIG. 11 depicts a block diagram 1100 showing an exemplary tree structure illustrating an example URI classifier, according to various example embodiments. As shown, the RBAC system 710 may classify a URI into a permission (e.g., first permission) upon receiving an API receive a request to provide access to certain resources. In various embodiments, the RBAC system 710 may construct a tree structure that includes a number of nodes, as illustrated in FIG. 11. The tree structure may also be referred to as a URI classifier. One or more permissions may be identified based on the URI classifier. Each node represents a part of the URI 1102 and is organized based on a URI template. A leaf node (e.g., leaf node 1108) represents a classified permission, such as permission 1106. The permission 1106 is associated with a unique identifier (e.g., SMSid). In various embodiments, A URI-classifier may be created or updated each time a change occurs to a URI template that is mapped to a permission.

FIG. 12 depicts a block diagram 1200 illustrating an example assertion tree, according to various example embodiments. In various embodiments, in order to authorize a request, the RBAC system generates a graph, such as an assertion tree, of all the permission a requested user has been granted and traverses the graph to match the classified permission with a permission included in the graph. If the RBAC system determines there is a match, the request will be authorized. Otherwise, the request will be denied. In various embodiments, the assertion tree may be generated at run time and dynamically updated at run time. For example, once an assertion tree is generated at run time, it may be stored in volatile computer memory (e.g., cache memory) for a limited time period, as an identity is likely to request access to resources again shortly after making the first request. In various embodiments, a session may be initiated once a request is authorized for an identity (e.g., a user, an application, or a credential). The graph may be temporarily stored in cache memory for the duration of the session.

Managing Access to Resources Using Serialized Tokens

Various embodiments include systems, methods, and non-transitory computer-readable media for generating and managing access to resources using role-based access control. In various embodiments, a role-based access control (RBAC)

system receives a request to provide access to a resource in a communication platform (e.g., via a console interface or an API interface). The RBAC system determines one or more permissions based on the request. A request may include one or more of: a Uniform Resource Identifier (URI), one or more hypertext transfer protocol (HTTP) verbs, and one or more headers. Specifically, the RBAC system may classify the URI into a permission. A permission is an authorization granted to an identity, such as a user, an application, or a credential, such as an API Key, to perform an action on a resource specified in the permission. A permission may be represented by a text string that includes four parts: namespace, product name, resource name, and the type of action. Each of these parts is an identifier separated by a "/," such as /namespace/product name/resource name/action. For example, a permission to make a phone call can be represented by a text string "/entity/product/call/create." In various embodiments, a wildcard (i.e., *) may be used to indicate all access to the associated part is granted. In some embodiments, a wildcard may be used to authorize multiple permissions at once. A text string may correspond to an assertion that maps to one or more URIs.

A resource may be associated with an identifier (e.g., a public URI) and method (e.g., GET, PUT, POST, DELETE). The communication platform may register multiple URIs for a single permission and may register multiple permissions for a single role. Once a permission is granted, the user may perform the action on the particular resource associated with the product and namespace specified in the permission. Actions configured to be performed on resources may include, for example, read, create, update, delete, and list.

Upon authorizing a request to provide access to certain resources, the RBAC system generates a serialized token to pass down the identified (or classified) one or more permissions to provide access to the requested resources. Specifically, upon authorizing the request, the processor generates a graph (e.g., a m-ary tree, as the first graph illustrated in FIG. 20) representing a serialized token that includes the verified permissions (e.g., the plurality of permissions). A m-ary tree is a data structure that includes a collection of nodes. The m-ary tree may be converted into a text string that consumes very little storage space in comparison to a string that is not converted from an m-ary tree. Under this approach, a serialized token may be packed in a header (e.g., HTTP header) of a file (or a request) to be passed to downstream services for optional processing (e.g., by one or more additional systems or services that are specially configured to consume the serialized token). The size of a header may depend on the type of web server. For example, the size of a header may be between 8 kb and 16 kb. In various embodiments, a size of a header may be an upper bound size for a header.

In various embodiments, accessing one resource requires permissions to access additional resources due to resource dependencies. Therefore, a number of permissions may be needed to be passed down to one or more services to provide access to the resource as requested. In various embodiments, a service includes one or more resources. In various embodiments, a service itself may be a resource.

In various embodiments, the RBAC system signs (or causes the signing of) the serialized token before passing the token to the downstream services (e.g., the first service) to provide access to the resource. In various embodiments, a serialized token is signed using a digital signature algorithm (e.g., Edwards-curve Digital Signature Algorithm) before being sent out by the RBAC system to downstream services (e.g., services 1318). In various embodiments, the RBAC system may generate and share a public key to allow other entities (e.g., external entities) to verify the serialized token.

In various embodiments, a role may be created for or assigned to an identity to include one or more permissions. In various embodiments, a user may be a person, or a group of people. A permission can be assigned to an application (e.g., an application associated with an application user), or to a credential (e.g., an API Key). An application may be developed by a third party (e.g., a customer) using client-side SDK kits provided by the communication platform.

In various embodiments, if the RBAC system is unable to classify the resource identifier (e.g., the URI) into an existing permission, the RBAC system may unauthorize the request, discard the request, or redirect the request to an additional system communicatively coupled to the communication platform and specially configured to handle the failure of the RBAC system to classify the resource identifier.

Figure 18:
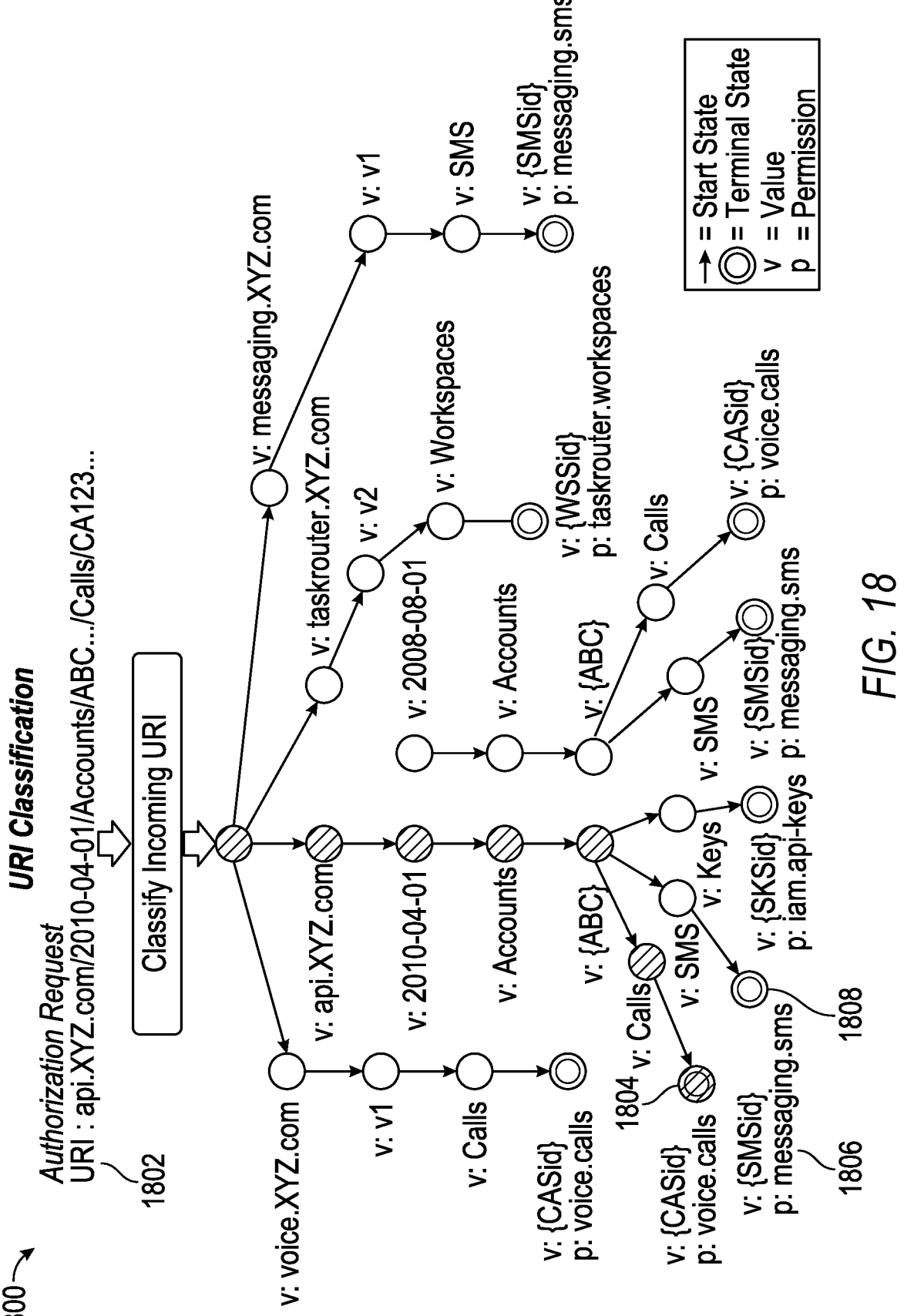
FIG. 18 depicts a block diagram showing an exemplary tree structure illustrating an example URI classifier, according to various example embodiments.

In various embodiments, the RBAC system generates a graph, such as a tree structure, of all the permission the identity has been granted, and traverses the graph to match the classified permission with a permission included in the graph, such as the graph illustrated in FIG. 18. If the RBAC system determines there is a match, the request may be authorized. Otherwise, the request may be denied. In various embodiments, the graph may be generated at run time. For example, once a graph (also referred to as assertion tree) is generated at run time, the graph may be stored in volatile computer memory (e.g., cache memory) for a limited time period, as an identity is likely to request access to resources again shortly after making the first request. In various embodiments, a session may be initiated once a request is authorized for an identity (e.g., a user, an application, or a credential). The graph may be temporarily stored in cache memory for the duration of the session. In various embodiments, RBAC system may dynamically update the graph to incorporate detected changes at run time.

In various embodiments, the RBAC system causes a display of a user interface, including an indication of authorization status indicating whether the request is authorized. For example, the indication of authorization status may be a selectable user interface element (e.g., a window or an icon) notifying the identity the request is allowed or denied. In some examples, if the request is authorized, the RBAC system may cause the requested resource to be accessible by the requesting identity (e.g., displaying the resource in the user interface) or cause the action specified in the permission to be automatically executed (e.g., deleting the resource specified in the request).

In various embodiments, the RBAC system may receive a request to assign a role (e.g., customized role) to an identity. The role is associated with a list of permissions. The RBAC system may match the list of permission specified in the request to existing permissions available on the communication platform and generate the role for the identity by associating the list of permissions with the identity. In various embodiments, the RBAC system provides existing permissions available on the communication platform to a customer so that the customer can create a role that can be assigned to an identity. The assignment may cause the list of permissions included in a role to be associated with the identity for access within a scope of resources.

Figure 13:
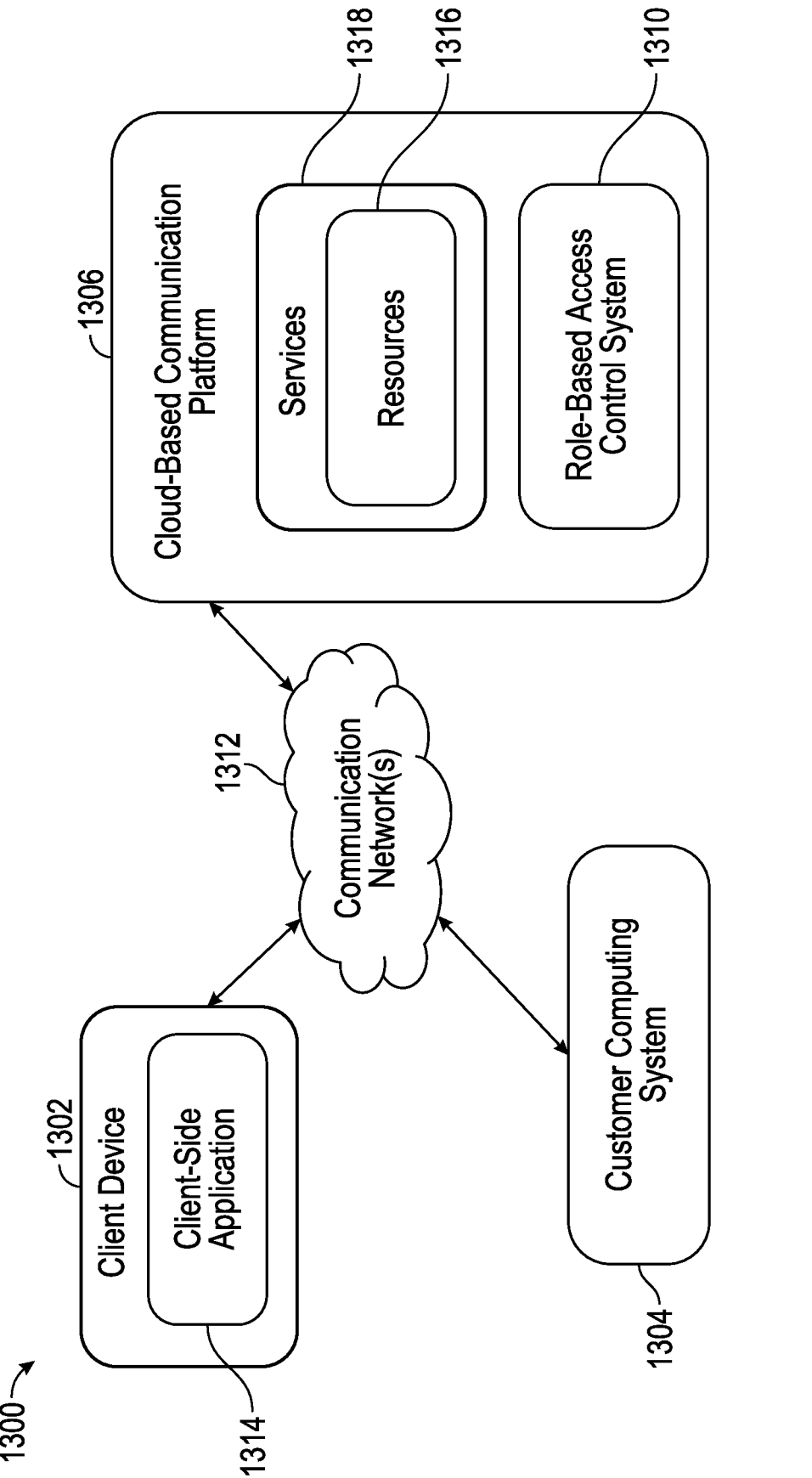
FIG. 13 depicts a block diagram showing an example networked environment in which the disclosed technology may be practiced, according to various example embodiments.

In various embodiments, a communication platform may include a number of products (or services) in the namespace. A resource may be a product, or a feature associated with a product, such as a phone number, a call record, a studio flow, or a message. The RBAC system may reside in the communication platform, as illustrated in FIG. 13, or may be an external system that is communicatively coupled to the communication platform. In various embodiments, a service includes one or more resources. In various embodiments, a service itself may be a resource.

In various embodiments, a request may be an API request that can be authenticated using an API key. An API request occurs when an identity (e.g., a user or an application) makes a call to a server using an endpoint. An API endpoint refers to a touchpoint of an interaction between an API and a system. An API endpoint provides the location where an API accesses a resource.

In various embodiments, a permission can register multiple URIs to accommodate multiple interfaces and system versions that can be used to access the resource, e.g., public API endpoints, console, SDK, etc.

According to various embodiments described herein, the RBAC system solves the technological problems, including all services having to implement their own access control systems. Under the approach described in various embodiments, the RBAC system provides a common API and token that allow all downstream systems to optionally use so that services don't have to implement their own APIs.

Reference will now be made in detail to embodiments of the present disclosure, examples of which are illustrated in the appended drawings. The present disclosure may, however, be embodied in many different forms and should not be construed as being limited to the embodiments set forth herein.

FIG. 13 depicts a block diagram showing an example networked environment 1300 in which the disclosed technology may be practiced, according to various example embodiments. As shown in FIG. 13, the example networked environment 1300 includes multiple computing devices (e.g., client device 1302), customer computing system 1304, and cloud-based communication platform 1306 communicatively coupled to a communication network 1312 and configured to communicate with each other through the use of the communication network 1312. The cloud-based communication platform 1306 includes resources 1316 and a role-based access control system 1310 (also referred to as RBAC system 1310). In various embodiments, services 1318 hosts or include one or more resources 1316. A service may use the RBAC system 1310 to manage access control. The RBAC system is meant to be a universal system that can be used by multiple services of the communication platform 1306 such that each of the services does not need to implement its own access controls. In various embodiments, a communication platform 1306 may include a number of products (or services 1318) in the namespace. A resource may be a product or service, or a feature associated with the product or service. The RBAC system may reside in the communication platform, as illustrated in FIG. 13, or may be an external system that is communicatively coupled to the communication platform 1306. In various embodiments, a service includes one or more resources. In various embodiments, a service itself may be a resource.

The communication network 1312 is any type of network, including a local area network (LAN), such as an intranet, a wide area network (WAN), such as the internet, a telephone and mobile device network, such as cellular network, or any combination thereof. Further, the communication network 1312 may be a public network, a private network, or a combination thereof. The communication network 1312 is implemented using any number of communication links associated with one or more service providers, including one or more wired communication links, one or more wireless communication links, or any combination thereof. Additionally, the communication network 1312 is configured to support the transmission of data formatted using any number of protocols.

Multiple computing devices can be connected to the communication network 1312. A computing device is any type of general computing device capable of network communication with other computing devices. For example, a computing device can be a personal computing device such as a desktop or workstation, a business server, or a portable computing device, such as a laptop, smart phone, or a tablet personal computer. A computing device can include some or all of the features, components, and peripherals of the machine 2200 shown in FIG. 22.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The customer computing system 1304 is one or more computing devices associated with a customer of the cloud-based communication platform 1306 (also referred to as communication platform 1306). A customer may be a business, a company, and/or any other type of entity that uses the services provided by communication platform 1306. The customer may provide any type of service, such as a banking service, travel service, retail service, and the like. The service may be an online and/or offline service. That is, the service may be available only online, such as an online retailer, offline, such as a physical retailer, or both online and offline, such as a retailer that provides a website or application as well as a physical retail store.

The customer computing system 1304 may facilitate any service of a customer that is provided online. In various embodiments, users of client devices 1302 may interact with the customer computing system 1304 via communication network 1312 to utilize the online service provided by the customer. The customer computing system 1304, however, does not have to provide an online service that is accessible to users. That is, the customer computing system 1304 may simply be a computing system used by a customer to perform any type of functionality. In various embodiments, a user of a client device 1302 may be a person or a group of people. A user may send requests to access certain resources on communication platform 1306. A customer of the customer computing system 1304 may be a business, company, and/or any other type of entity that develops applications using client-side SDK kits provided by the communication platform 1306. The application (also referred to as application user) may send requests to access certain resources on the communication platform 1306.

Although the networked environment 1300 in FIG. 13 illustrates only one client device 1302, and one customer computing system 1304, this is only for ease of explanation and is not meant to be limiting. One skilled in the art would appreciate that the networked environment 1300 can include any number of client devices 1302, and/or customer computing systems 1304. Further, each customer computing system 1304 may concurrently interact with any number of client devices 1302, and support connections from a variety of different types of client devices 1302, such as desktop computers, mobile computers, mobile communications devices, e.g., mobile phones, smart phones, tablets; smart televisions, set-top boxes, and/or any other network-enabled computing devices. Hence, the client devices 1302 may be of varying types, capabilities, operating systems, and so forth.

A user interacts with a customer computing system 1304 via a client-side application 1314 installed on the client devices 1302. In some embodiments, the client-side application 1314 includes a component specific to the customer computing system 1304. For example, the component may be a stand-alone application, one or more application plug-ins, and/or a browser extension. However, the users may also interact with the customer computing system 1304 via a third-party application, such as a web browser or messaging application, that resides on the client devices 1302 and is configured to communicate with the customer computing system 1304. In either case, the client-side application presents a user interface (UI) for the user to interact with the customer computing system 1304. For example, the user interacts with the customer computing system 1304 via a client-side application integrated with the file system or via a webpage displayed using a web browser application.

A user may also interact with communication platform 1306 via the client-side application 1314 installed on the client devices 1302. In some embodiments, the client-side application includes a component specific to the communication platform 1306. For example, the component may be a stand-alone application, one or more application plug-ins, and/or a browser extension. In various embodiments, the user may also interact with the communication platform 1306 via console interface provided by the communication platform 1306, such as a web browser or messaging application configured to communicate with the communication platform 1306. In either case, the client-side application presents a user interface (UI) for the user to interact with the communication platform 1306. A user or a customer may interact with communication platform 1306 via an API interface or a console interface provided by the communication platform 1306.

A customer may use a customer computing system 1304 to cause transmission of communication messages (e.g., SMS messages) to intended recipients. For example, a customer computing system 1304 may provide online functionality that enables users of the customer computing system 1304 to transmit messages to agents of the customer and/or other users. As another example, the customer computing system 1304 may transmit messages to users to provide the users with two-factor authentication, password resets, updates, links to content, promotions, etc.

Figure 14:
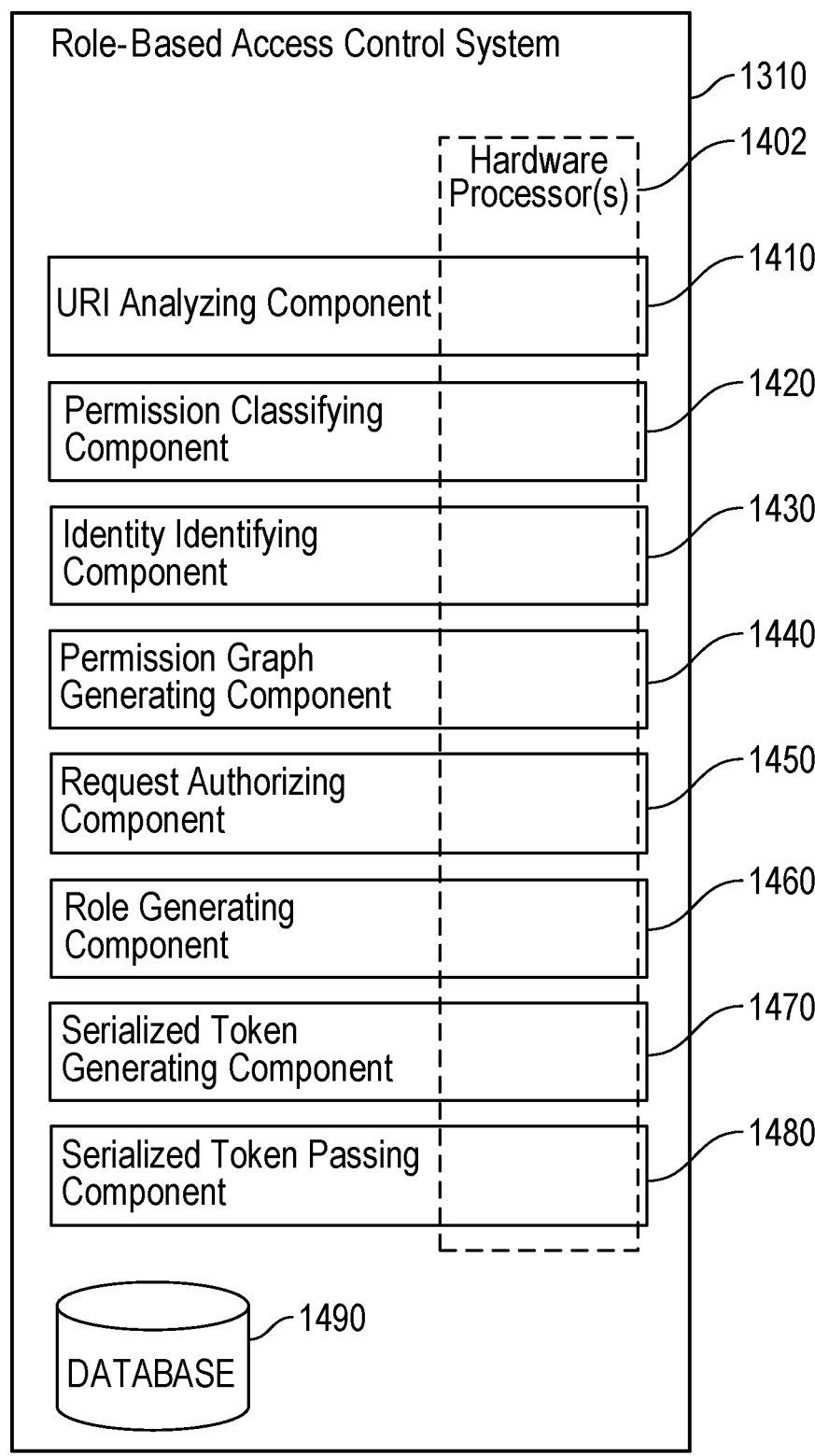
FIG. 14 depicts a block diagram illustrating an example role-based access control system for managing access to resources using serialized tokens, according to various example embodiments.

FIG. 14 depicts a block diagram 1400 illustrating an example role-based access control system for managing access to resources using serialized tokens, according to various example embodiments. For some embodiments, the role-based access control system 1310 represents an example of the role-based access control system 1310 described with respect to FIG. 13. As shown, the role-based access control (RBAC) system 1310 comprises a URI analyzing component 1410, a permission classifying component 1420, an identity identifying component 1430, a permission graph generating component 1440, a request authorizing component 1450, a role generating component 1460, a serialized token generating component 1470, and a serialized token passing component 1480.

The URI analyzing component 1410 is configured to receive a request to provide access to one or more resources on the communication platform 1306. The request may be an API request that is associated with a URI. The URI analyzing component 1410 is configured to analyze the URI to break it down to a format that can be mapped to an existing permission.

In various embodiments, access to one resource may require access to other resources, due to the resource dependencies configured by the communication platform 1306. Therefore, URI analyzing component 1410 may identify a plurality of permissions in order to provide access to the particular resource identified from the URI. In various embodiments, a plurality of permissions may correspond to one or more services, each of which hosts one or more resources.

The permission classifying component 1420 is configured to classify the URI into one or more permissions that allow access to one or more resources on the communication platform 1306. In various embodiments, the permission classifying component 1420 may construct a tree structure that includes a number of nodes, as illustrated in FIG. 18. The tree structure may also be referred to as a URI classifier. One or more permissions may be identified based on the URI classifier. Each node represents a part of a URI, such as URI 1802, as illustrated in FIG. 18, and is organized based on a URI template. The leaf node 1808 represents a classified permission, such as permission 1806. Permission 1806 is associated with a unique identifier (e.g., SMSid). In various embodiments, multiple permissions may be identified based on the request using the URI classifier, as illustrated in FIG. 18. A URI-classifier may be created or updated each time a change occurs to a URI template mapped to a permission.

The identity identifying component 1430 is configured to identify an identity associated with the request. The identity may be associated with one or more granted permissions. An identity, such as a user, may be assigned multiple roles. Each role may be associated with one or more permissions to access one or more resources on the communication platform 1306.

Figure 19:
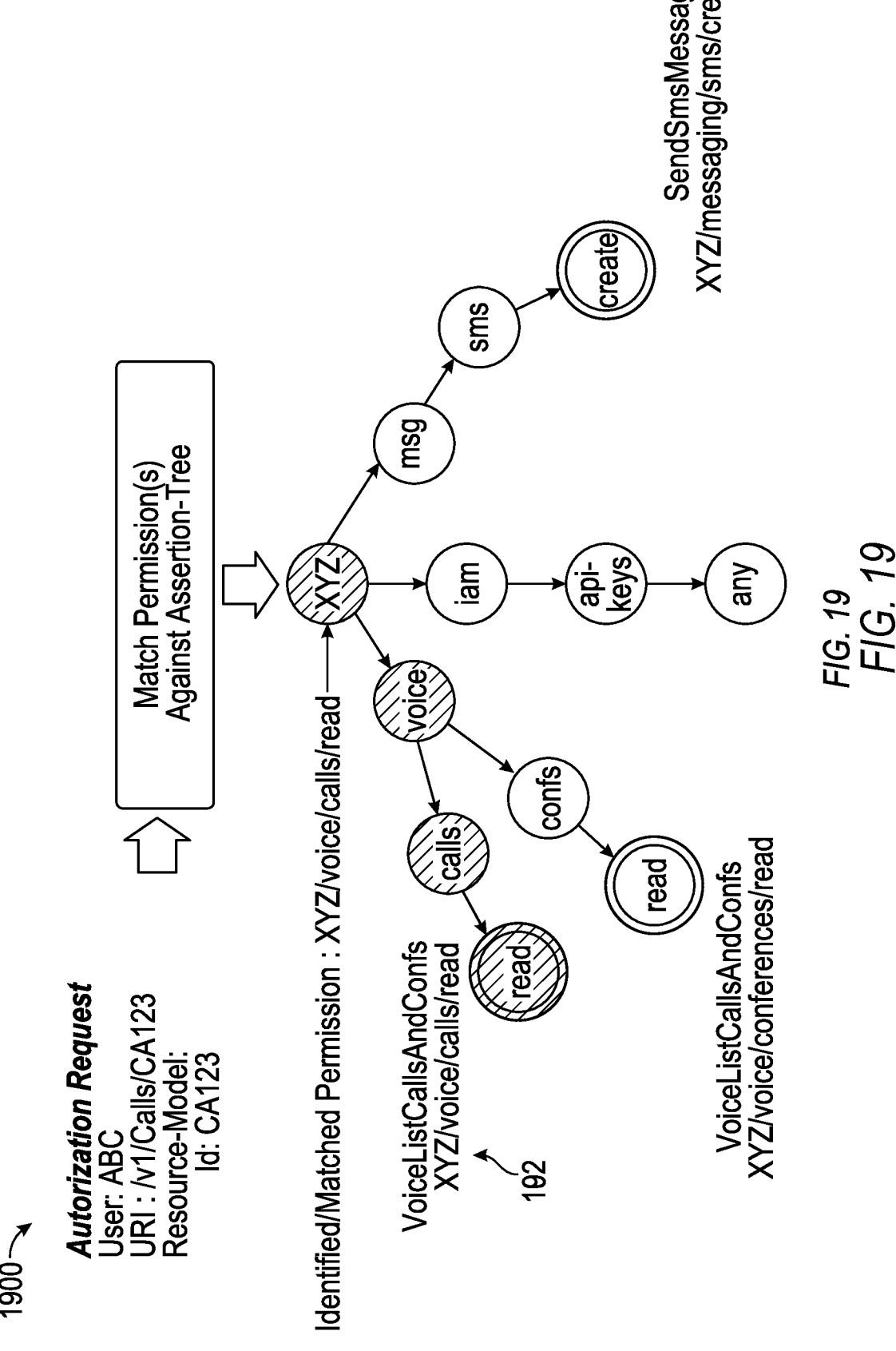
FIG. 19 depicts a block diagram illustrating an example assertion tree, according to various example embodiments.

The permission graph generating component 1440 is configured to generate, at runtime, a graph representing the one or more granted permissions associated with the identified identity. The graph, as illustrated in FIG. 19, may also be referred to as an assertion tree. The graph, once generated, may be stored in volatile computer memory (e.g., cache memory) for a limited time period, as an identity is likely to make another request again after a session is initiated. In various embodiments, a session may be initiated once a request is authorized for an identity. The graph may be temporarily stored in cache memory for the duration of the session.

The request authorizing component 1450 is configured to authorize the request (e.g., an API request) by traversing the graph (e.g., assertion tree) to determine that the one or more permissions are included in the one or more granted permissions. As illustrated in FIG. 19, permission 1902 (i.e., /XYZ/voice/calls/read) is identified from the graph, indicating user (e.g., actor "ABC") has been granted the permission to "read" the resource "calls" for product "voice" that is associated with namespace "XYZ." A namespace may refer to a service provider of the cloud-based communication platform 1306.

The role generating component 1460 is configured to create roles based on requests from users. A role can be a built-in role that is pre-configured for a particular product or namespace, or a customized role created for an identity that makes a specified request. A customized role may be created for a user to include one or more permissions.

Under the approach described in various embodiments herein, the RBAC system provides functionalities of generating and managing roles (e.g., customized roles) at a granular level that existing solutions cannot provide. A role may be generated to include one or more permissions defined by the text string that includes four parts: namespace, product name, resource name, and the type of action. For example, a customized role may be created to include a single permission that specifies the exact action that can be performed to a specified resource associated with a product and a namespace.

In various embodiments, a user may be a person, a group of people, or an application (e.g., application user). An application may be developed by a third party using a client-side Software Development Kit ("SDK") provided by the communication platform 1306.

Figure 20:
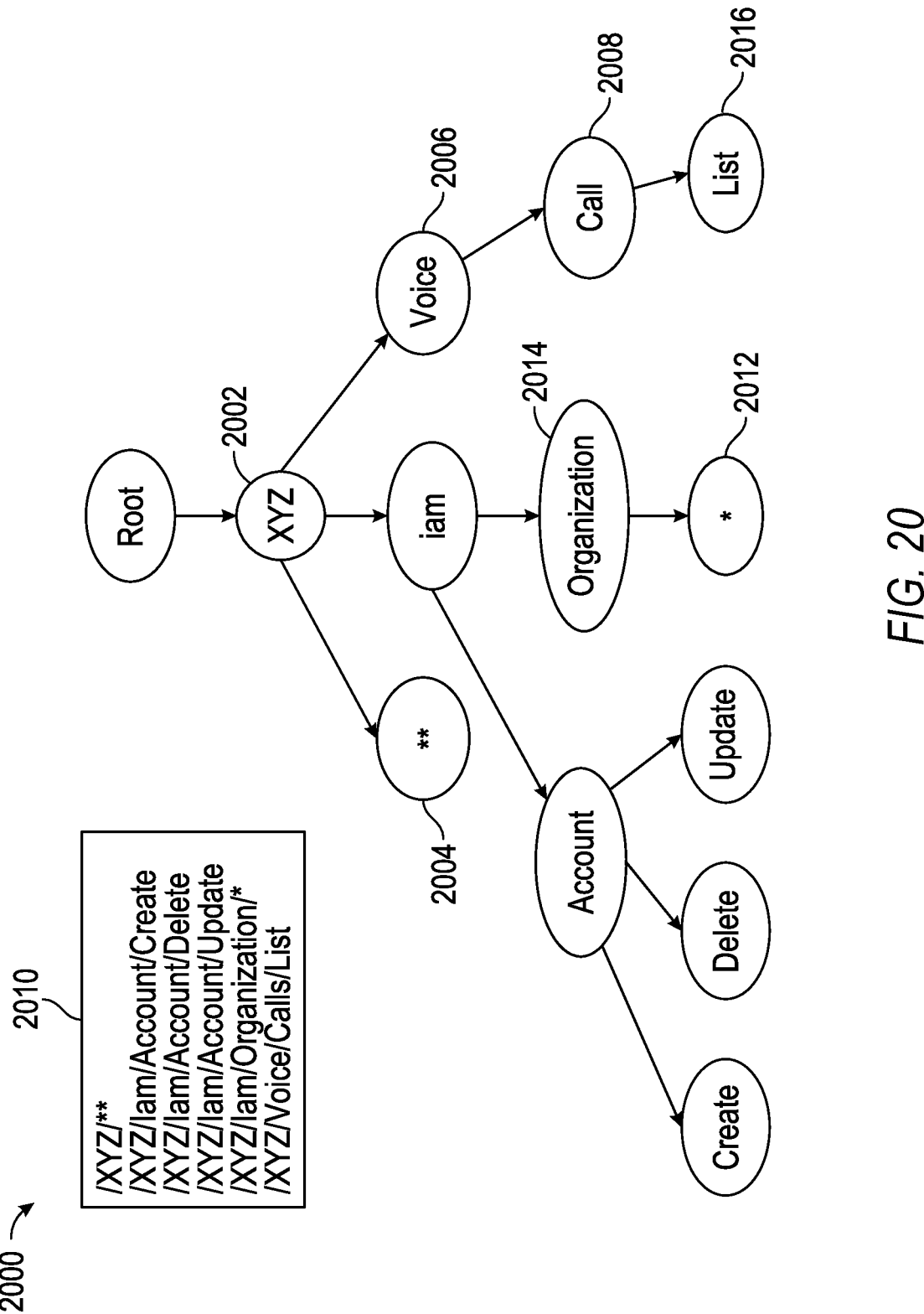
FIG. 20 depicts a block diagram illustrating an example graph representing a serialized token, according to some embodiments.

Upon authorizing the request, the serialized token generating component 1470 is configured to generate a graph (e.g., a m-ary tree) as a serialized token that represents the verified permissions (e.g., the plurality of permissions). A m-ary tree is a data structure that includes a collection of nodes. FIG. 20 illustrates an example m-ary tree, which may be converted into a text string "/XYZ **/iam account create/delete/update//organization*///voice calls list." The text string represents the serialized token. Since the serialized token takes up little storage space, it can be packed in a header of an HTTP request to be transmitted to downstream services for processing.

The serialized token passing component 1480 is configured to pass the serialized token to downstream services for providing access to the requested resources. In various embodiments, a serialized token is signed using a digital signature algorithm (e.g., Edwards-curve Digital Signature Algorithm) before being sent out by the RBAC system.

Figure 15:
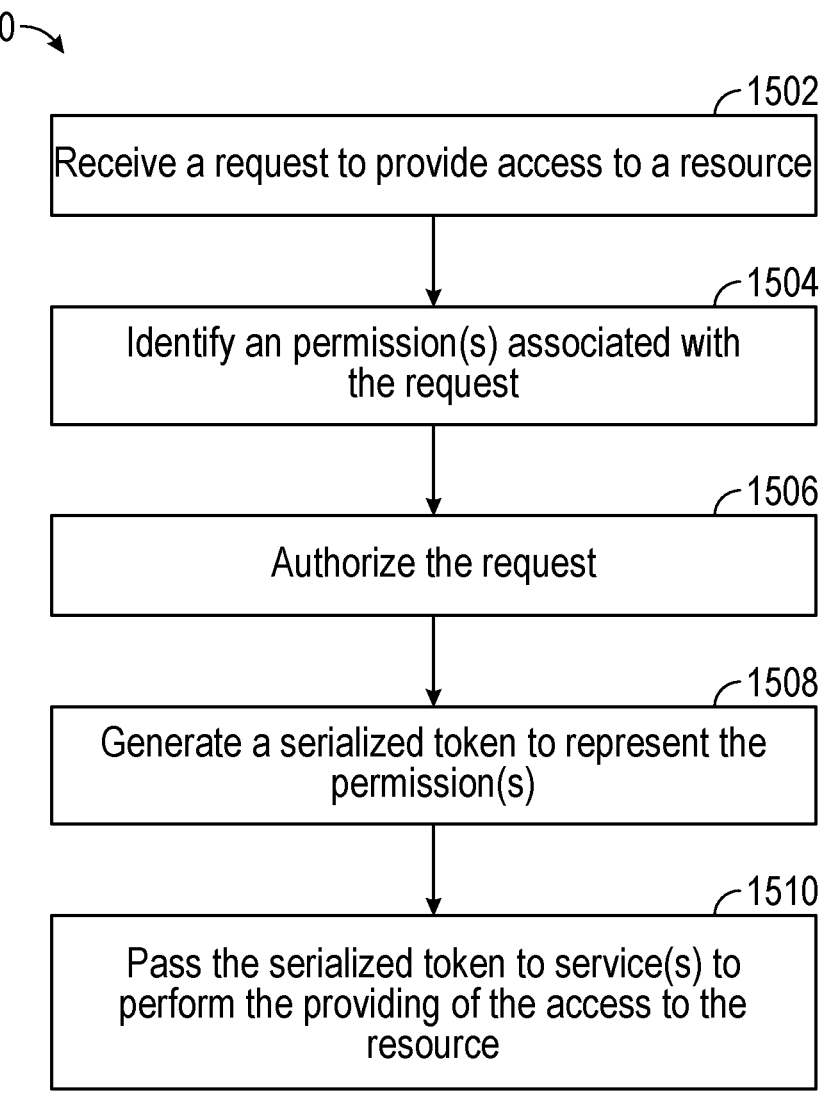
FIG. 15 depicts a flowchart illustrating an example method for managing access to resources using serialized tokens by an example role-based access control system during operation, according to various example embodiments.

FIG. 15 depicts a flowchart illustrating an example method 1500 for managing access to resources using serialized tokens by an example role-based access control system 1310 during operation, according to various example embodiments. It will be understood that example methods described herein may be performed by a machine in accordance with some embodiments. For example, method 1500 can be performed by the RBAC system 1310 described with respect to FIG. 13 and FIG. 14, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 1500 may be represented by executable instructions that, when executed by a processor of a computing device, cause the computing device to perform method 1500. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 1502, the processor receives a request to provide access to one or more resources on the communication platform 1306. The request may be an API request that is associated with a URI. In example embodiments, the request may be generated (via a call to an API of the RBAC system 1310) by one or more downstream systems or services. In example embodiments, the request may be responsive to a detection of an attempt by a user (e.g., via client-side application 1314 and/or client device 1302) or a request received from the user at the one or more downstream systems or services to access the one or more resources.

At operation 1504, the processor identifies a plurality of permissions associated with the request. In some instances, accessing a resource requires permissions to access other resources due to resource dependencies. Therefore, the processor may identify a plurality of permissions based on the one or more permissions identified using the URI classifier, as illustrated in FIG. 18. In example embodiments, the plurality of permissions may be specified by a customer (e.g., via customer computing system 1304) through a call of an API of the RBAC system 1310.

In various embodiments, the plurality of permissions corresponds to one or more services (e.g., services 1318). The resource may be associated with a service (e.g., first service) included in the one or more services. The first service is associated with the one or more permissions identified using the URI classifier.

At operation 1506, the processor authorizes the request. The authorization includes determining whether the plurality of permissions is granted for the identity associated with the request. Under the approach described in various embodiments herein, the RBAC system provides functionalities of generating and managing roles (e.g., customized roles) at a granular level that existing solutions cannot provide. A role may be generated to include one or more permissions defined by the text string that includes four parts: namespace, product name, resource name, and the type of action. For example, a role may be created to include a single permission that specifies the exact action that can be performed to a specified resource associated with a product and a namespace.

At operation 1508, the processor generates a serialized token to represent the plurality of permissions. Specifically, upon authorizing the request, the processor generates a graph (e.g., a m-ary tree) representing a serialized token that includes the verified plurality of permissions. A m-ary tree is a data structure that includes a collection of nodes. FIG. 20 illustrates an example m-ary tree, which may be converted into a text string "/XYZ **/iam account create/delete/update//organization*///voice calls list." The text string represents the serialized token and consumes very little storage space. Under this approach, the serialized token may be packed in a header of an HTTP request to be transmitted to downstream services for processing.

At operation 1510, the processor passes the serialized token to the downstream services (e.g., first service) to perform the providing of access to the resource. In various embodiments, a serialized token is signed using a digital signature algorithm (e.g., Edwards-curve Digital Signature Algorithm) before being sent out by the RBAC system to downstream services (e.g., services 1318). In various embodiments, downstream services may include contact center, dialplan, phone number services, and so on. In example embodiments, the representation of the permissions in the specialized data structure (e.g., the m-ary tree) may not only reduces the size of the token in comparison to some alternative representations, but also reduce the amount of time required to process the token by each downstream system; therefore, one or more of memory, bandwidth, or processing power requirements for implementing controlled access to the resources may be reduced through the use of the RBAC system 1310.

Though not illustrated, method 1500 can include an operation where a graphical user interface for managing access to computing resources can be displayed (or caused to be displayed) by the hardware processor. For instance, the operation can cause a client device (e.g., the client device 1302 communicatively coupled to the RBAC system 1310) to display the graphical user interface for managing access to computing resources. This operation for displaying the graphical user interface can be separate from operations 1502 through 1510 or, alternatively, form part of one or more of operations 1502 through 1510. In example embodiments, the graphical user interface may be caused to be generated and presented (e.g., on client device 1302) based on return values received from calls to the API of the RBAC system 1310, such as return values indicating one or more actions or whether permissions to access one or more resources are to be authorized.

Figure 16:
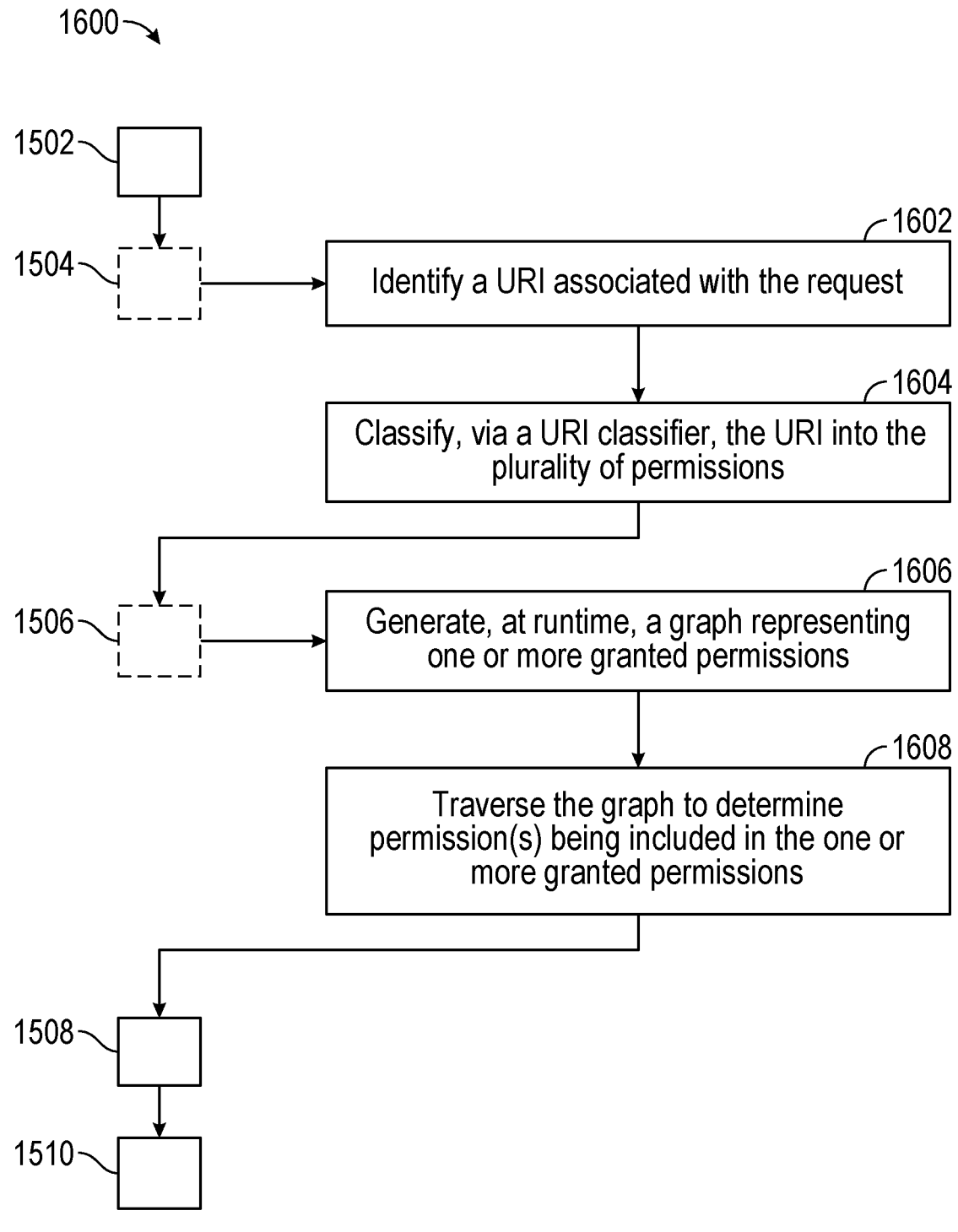
FIG. 16 depicts a flowchart illustrating another example method for managing access to resources using serialized tokens by an example role-based access control system during operation, according to various example embodiments.

FIG. 16 depicts a flowchart illustrating an example method 1600 for managing access to resources using serialized tokens by an example role-based access control system 1310 during operation, according to various example embodiments. It will be understood that example methods described herein may be performed by a machine in accordance with some embodiments. For example, method 1600 can be performed by the RBAC system 1310 described with respect to FIG. 13 and FIG. 14, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 1600 may be represented by executable instructions that, when executed by a processor of a computing device, cause the computing device to perform method 1600. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Method 1600 starts with operation 1502, as described herein. In various embodiments, operation 1504 includes operations 1602 and 1604. In various embodiments, operation 1506 includes operations 1606 and 1608.

At operation 1602, the processor identifies a URI associated with the request.

At operation 1604, the processor classifies the URI into one or more permissions to access a resource on the communication platform 1306. In various embodiments, the processor may construct a tree structure that includes a number of nodes, as illustrated in FIG. 18. The tree structure may also be referred to as a URI classifier. Each node represents a part of a URI, such as URI 1802, as illustrated in FIG. 18, and is organized based on a URI template. The leaf node 1808 represents a classified permission, such as permission 1806. Permission 1806 is associated with a unique identifier (e.g., SMSid). In various embodiments, a URI classifier may be created or updated every time a change occurs to any URI templates mapped to a permission. In various embodiments, the processor generates the URI classifier based on a URI template and updates the URI classifier at run time based on changes made to the URI template.

At operation 1606, the processor generates a graph representing the one or more granted permissions associated with the identified identity at runtime. A graph, as illustrated in FIG. 19, may also be referred to as an assertion tree, representing a number of granted permissions associated with an identity. The assertion tree, once generated, may be stored in volatile computer memory (e.g., cache memory) for a limited time period, as a user is likely to make another request again shortly after making the first one. In various embodiments, a session may be initiated once a request is authorized for a user. The graph may be temporarily stored in cache memory for the duration of the session.

At operation 1608, the processor authorizes the request (e.g., an API request) by traversing the graph (e.g., assertion tree as illustrated in FIG. 19) to determine that the permission is included in the one or more granted permissions for the identity associated with the request. In FIG. 19, permission 1902 (i.e., /XYZ/voice/calls/read) is identified from the graph, indicating user "ABC" has been granted the permission to "read" the resource "calls" for product "voice," belonged to namespace "XYZ." In various embodiments, a valid action to be included in a permission may be "read," "create," "update," "delete," or "list." In various embodiments, the processor may identify multiple permissions from the assertion tree based on the permissions identified based on the request.

In various embodiments, the providing of access to the resource includes causing a display of a user interface of a device (e.g., client device 1302) associated with the identified identity. The user interface includes an indication of authorization status, indicating whether the request is authorized. For example, the indication of authorization status may be a selectable user interface element (e.g., a window or an icon) notifying the user the request is allowed or denied. In some examples, depending on the type of permission or the gateway (e.g., console interface or API interface) from which a request comes in, the RBAC system may cause the requested resource to be accessible by the requesting user (e.g., displaying the resource in the user interface) or cause the action specified in the permission to be executed automatically (e.g., deleting the resource specified in the request).

In various embodiments, the RBAC system may receive a request to assign a customized role to a user. The customized role may be associated with a list of permissions. The RBAC system may match the list of permission to existing permissions associated with resources on the communication platform 1306, and generate the customized role for the user, such as by associating the list of permissions with an identity of the user. Under the approach described in various embodiments herein, the RBAC system 1310 provides functionalities of generating and managing customized roles at a granular level that existing solutions cannot provide. A customized role may be generated to include one or more permissions defined by the text string that includes four parts: namespace identifier, product identifier, resource identifier, and actions identifier. For example, a customized role may be created to include a single permission that specifies the exact action that can be performed to a specified resource associated with a product and a namespace.

In various embodiments, a communication platform may include a number of products in the namespace (e.g., XYZ). A resource may be a product (e.g., Voice), a feature (e.g., calls or SMS) associated with a product. The RBAC system

1310 may reside in the communication platform 1306, as illustrated in FIG. 13, or it may be an external system that is communicatively coupled to the communication platform 1306.

In various embodiments, a request may be an API request that can be authorized using an API key. An API request occurs when an identity (e.g., a user or an application) adds an endpoint to a URI and makes a call to a server. An API endpoint refers to a touchpoint of an interaction between an API and a system. An API endpoint provides the location where an API accesses a resource.

In various embodiments, a permission is represented by a text string including a namespace identifier, a product identifier (e.g., product name), a resource identifier (e.g., resource name), and an action identifier that indicates the type of action.

In various embodiments, a graph is a tree structure representing the one or more granted permissions. The one or more granted permissions correspond to a role assigned to an identity (e.g., a user, an application, or a credential, such as an API Key).

In various embodiments, the processor receives a request to assign a role (e.g., a customized role) to an identity (e.g., a user, an application, or a credential, such as an API Key). Based on the request, the processor determines that permissions included in the request are valid actions that can be performed on resources in the communication platform 1306. Based on the determination, the processor creates a role for the identity to include the permissions.

Though not illustrated, method 1600 can include an operation where a graphical user interface for managing access to computing resources can be displayed (or caused to be displayed) by the hardware processor. For instance, the operation can cause a client device (e.g., the client device 1302 communicatively coupled to the RBAC system 1310) to display the graphical user interface for managing access to computing resources. This operation for displaying the graphical user interface can be separate from operations 1602 through 1608 or, alternatively, form part of one or more of operations 1602 through 1608.

Figure 17:
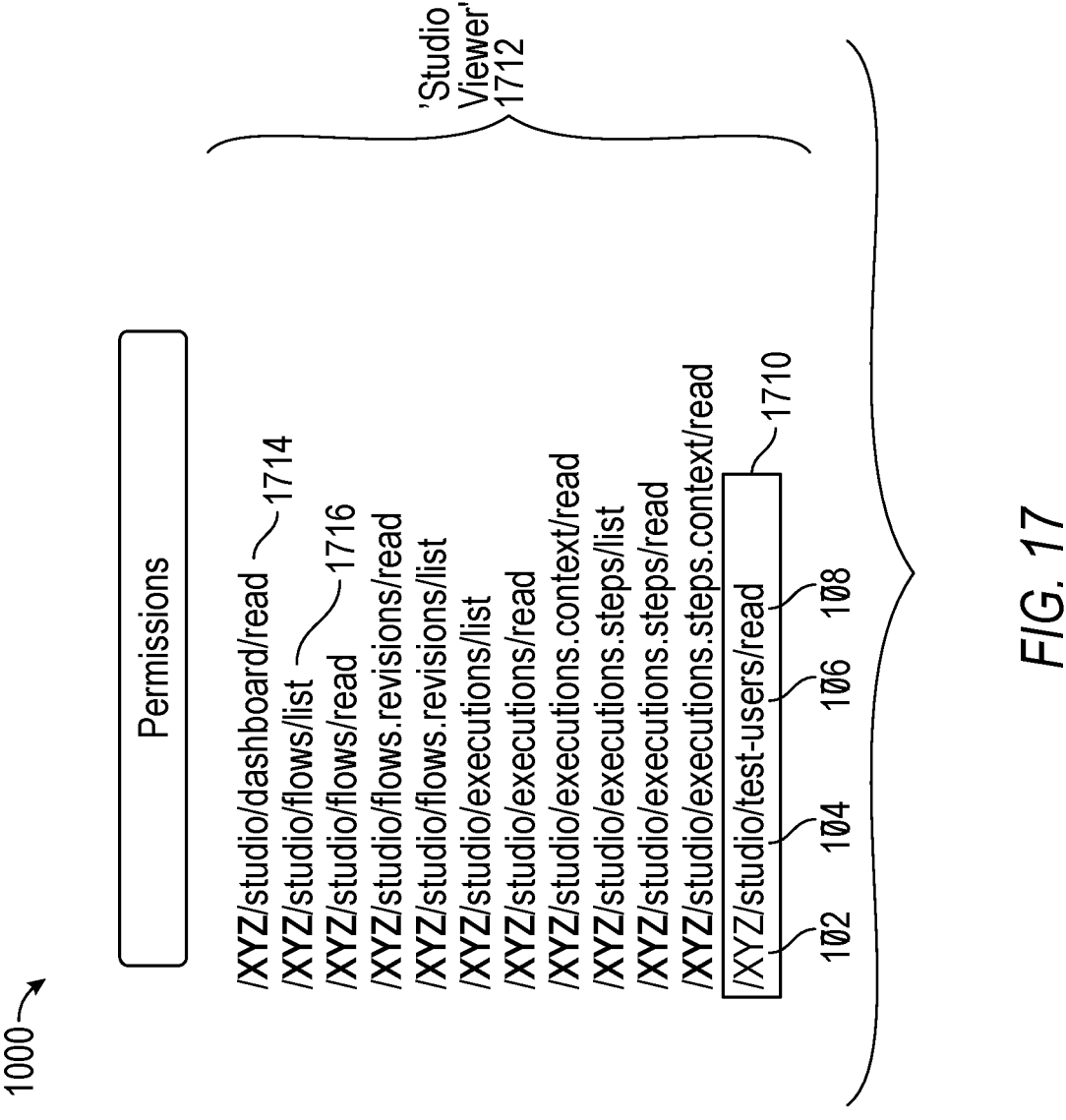
FIG. 17 depicts a block diagram illustrating an example set of permissions included in a customized role, according to various example embodiments.

FIG. 17 depicts a block diagram 1700 illustrating an example set of permissions included in a customized role, according to various example embodiments. As shown, role 1712, named "Studio Viewer," includes a set of permissions, including permission 1710. The permission 1710, similar to other permissions as illustrated in FIG. 17, is represented by a text string comprising four parts: "XYZ" as namespace identifier 1702, "studio" as product identifier 1704, "test-users" as resource identifier 1706, and "read" as action identifier 1708. A namespace may refer to a service provider of the cloud-based communication platform 1306. A role represents a known access pattern for a product and is offered out-of-the-box as part of the communication platform. For example, role 1712 "Studio Viewer" is a role that allows a user only to view Studio flows and not be able to edit them. As illustrated in FIG. 17, the actions associated with the list of permissions for "Studio Viewer" are limited to "read 1714" and "list 1716." A role may be a built-in role or a customized role. A built-in role may not be modifiable by a customer or a user. A customer may create and manage their own customized roles to facilitate the services it provides.

FIG. 18 depicts a block diagram 1800 showing an exemplary tree structure illustrating an example URI classifier, according to various example embodiments. As shown, the RBAC system 1310 may classify a URI into a permission (e.g., first permission) upon receiving an API receive a request to provide access to certain resources. In various embodiments, the RBAC system 1310 may construct a tree structure that includes a number of nodes, as illustrated in FIG. 18. The tree structure may also be referred to as a URI classifier. One or more permissions may be identified based on the URI classifier. Each node represents a part of the URI 1802 and is organized based on a URI template. The leaf node (e.g., leaf node 1808) represents a classified permission, such as permission 1806. The permission 1806 is associated with a unique identifier (e.g., SMSid). In various embodiments, A URI-classifier may be created or updated each time a change occurs to a URI template that is mapped to a permission.

FIG. 19 depicts a block diagram 1900 illustrating an example assertion tree, according to various example embodiments. In various embodiments, in order to authorize a request, the RBAC system generates a graph (e.g., the second graph), such as an assertion tree, of all the permission a requested user has been granted and traverses the graph to match the classified permission with a permission included in the graph. If the RBAC system determines there is a match, the request will be granted. Otherwise, the request will be denied. In various embodiments, the graph may be generated at run time and dynamically updated at run time. For example, once a graph is generated at run time, the graph may be stored in volatile computer memory (e.g., cache memory) for a limited time period, as a user is likely to request access to resources again shortly after making the first request. In various embodiments, a session may be initiated once a request is authorized for an identity user. The graph may be temporarily stored in cache memory for the duration of the session.

FIG. 20 depicts a block diagram illustrating an example graph representing a serialized token, according to some embodiments. As shown, item 2010 represents the plurality of permissions identified based on the request to provide access to a resource. Upon authorizing the request to determine the identity is granted all permissions listed in item 2010, the RBAC system serializes the plurality of permissions by generating the graph, as shown in FIG. 20, representing a serialized token. The graph may be a m-ary tree that includes a number of nodes. The graph is generated based on the text string format that represents a permission. Specifically, a text string that represents a permission includes four parts: namespace, product name, resource name, and the type of action, such as "/namespace/product name/resource name/action." As illustrated in FIG. 20, node 2002 represents a namespace "XYZ," node 2006 represents a product "voice," node 2008 represents a resource "call," and leaf node 2016 represents an action "list." Node 2012 "*" represents any actions as it belongs to node 2014 that represents a resource. Node 2004 "" represents any product, resource, and actions, as it is a child node of node 2002** that represents the namespace "XYZ."

Figure 21:
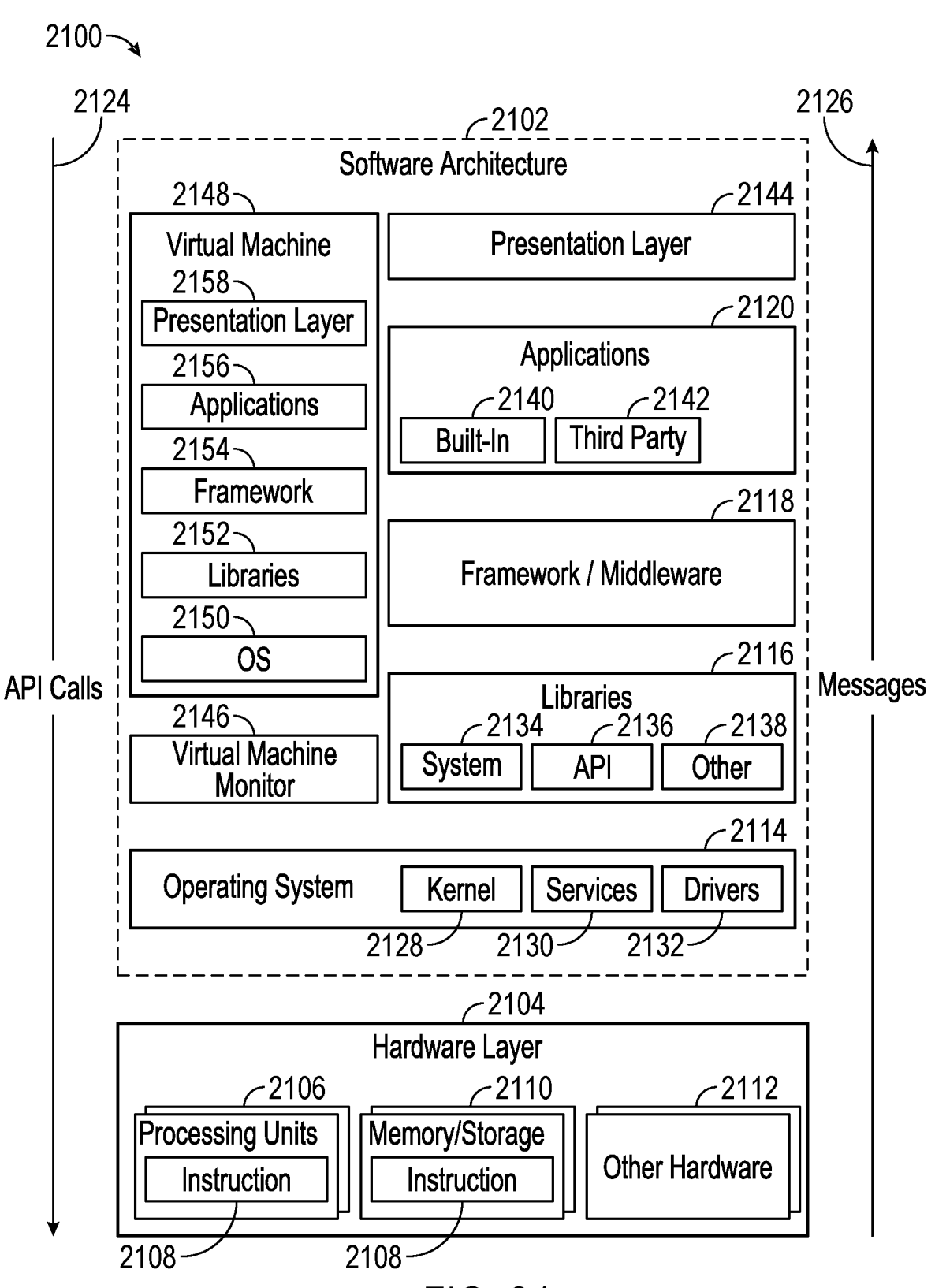
FIG. 21 depicts a block diagram illustrating an architecture of software, according to some embodiments.

FIG. 21 is a block diagram illustrating an example of a software architecture 2102 that may be installed on a machine, according to some example embodiments. FIG. 21 is merely a non-limiting example of software architecture, and it will be appreciated that many other architectures may be implemented to facilitate the functionality described herein. The software architecture 2102 may be executing on hardware such as a machine 2200 of FIG. 22 that includes, among other things, processors 2210, memory 2230, and input/output (I/O) components 2250. A representative hardware layer 2104 is illustrated and can represent, for example, the machine 2200 of FIG. 22. The representative hardware layer 2104 comprises one or more processing units 2106 having associated executable instructions 2108. The executable instructions 2108 represent the executable instructions of the software architecture 2102. The hardware layer 2104 also includes memory or storage modules 2110, which also have the executable instructions 2108. The hardware layer 2104 may also comprise other hardware 2112, which represents any other hardware of the hardware layer 2104, such as the other hardware illustrated as part of the machine 2100.

In the example architecture of FIG. 21, the software architecture 2102 may be conceptualized as a stack of layers, where each layer provides particular functionality. For example, the software architecture 2102 may include layers such as an operating system 2114, libraries 2116, frameworks/middleware 2113, applications 2120, and a presentation layer 2144. Operationally, the applications 2120 or other components within the layers may invoke API calls 2124 through the software stack and receive a response, returned values, and so forth (illustrated as messages 2126) in response to the API calls 2124. The layers illustrated are representative in nature, and not all software architectures have all layers. For example, some mobile or special-purpose operating systems may not provide a frameworks/middleware 2113 layer, while others may provide such a layer. Other software architectures may include additional or different layers.

The operating system 2114 may manage hardware resources and provide common services. The operating system 2114 may include, for example, a kernel 2123, services 2130, and drivers 2132. The kernel 2123 may act as an abstraction layer between the hardware and the other software layers. For example, the kernel 2123 may be responsible for memory management, processor management (e.g., scheduling), component management, networking, security settings, and so on. The services 2130 may provide other common services for the other software layers. The drivers 2132 may be responsible for controlling or interfacing with the underlying hardware. For instance, the drivers 2132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2116 may provide a common infrastructure that may be utilized by the applications 2120 and/or other components and/or layers. The libraries 2116 typically provide functionality that allows other software modules to perform tasks in an easier fashion than by interfacing directly with the underlying operating system 2114 functionality (e.g., kernel 2123, services 2130, or drivers 2132). The libraries 2116 may include system libraries 2134 (e.g., C standard library) that may provide functions such as memory allocation functions, string manipulation functions, mathematic functions, and the like. In addition, the libraries 2116 may include API libraries 2136 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2116 may also include a wide variety of other libraries 2133 to provide many other APIs to the applications 2120 and other software components/modules.

The frameworks 2113 (also sometimes referred to as middleware) may provide a higher-level common infrastructure that may be utilized by the applications 2120 or other software components/modules. For example, the frameworks 2113 may provide various graphical user interface functions, high-level resource management, high-level location services, and so forth. The frameworks 2113 may provide a broad spectrum of other APIs that may be utilized by the applications 2120 and/or other software components/modules, some of which may be specific to a particular operating system or platform.

The applications 2120 include built-in applications 2140 and/or third-party applications 2142. Examples of representative built-in applications 2140 may include, but are not limited to, a home application, a contacts application, a browser application, a book reader application, a location application, a media application, a messaging application, or a game application.

The third-party applications 2142 may include any of the built-in applications 2140, as well as a broad assortment of other applications. In a specific example, the third-party applications 2142 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 2142 may invoke the API calls 2124 provided by the mobile operating system such as the operating system 2114 to facilitate functionality described herein.

The applications 2120 may utilize built-in operating system functions (e.g., kernel 2123, services 2130, or drivers 2132), libraries (e.g., system libraries 2134, API libraries 2136, and other libraries 2133), or frameworks/middleware 2113 to create user interfaces to interact with users of the system. Alternatively, or additionally, in some systems, interactions with a user may occur through a presentation layer, such as the presentation layer 2144. In these systems, the application/module "logic" can be separated from the aspects of the application/module that interact with the user.

Some software architectures utilize virtual machines. In the example of FIG. 21, this is illustrated by a virtual machine 2143. The virtual machine 2143 creates a software environment where applications/modules can execute as if they were executing on a hardware machine (e.g., machine 2200 of FIG. 22). The virtual machine 2143 is hosted by a host operating system (e.g., the operating system 2114) and typically, although not always, has a virtual machine monitor 2146, which manages the operation of the virtual machine 2143 as well as the interface with the host operating system (e.g., the operating system 2114). A software architecture executes within the virtual machine 2143, such as an operating system 2150, libraries 2152, frameworks/middleware 2154, applications 2156, or a presentation layer 2153. These layers of software architecture executing within the virtual machine 2143 can be the same as corresponding layers previously described or may be different.

Figure 22:
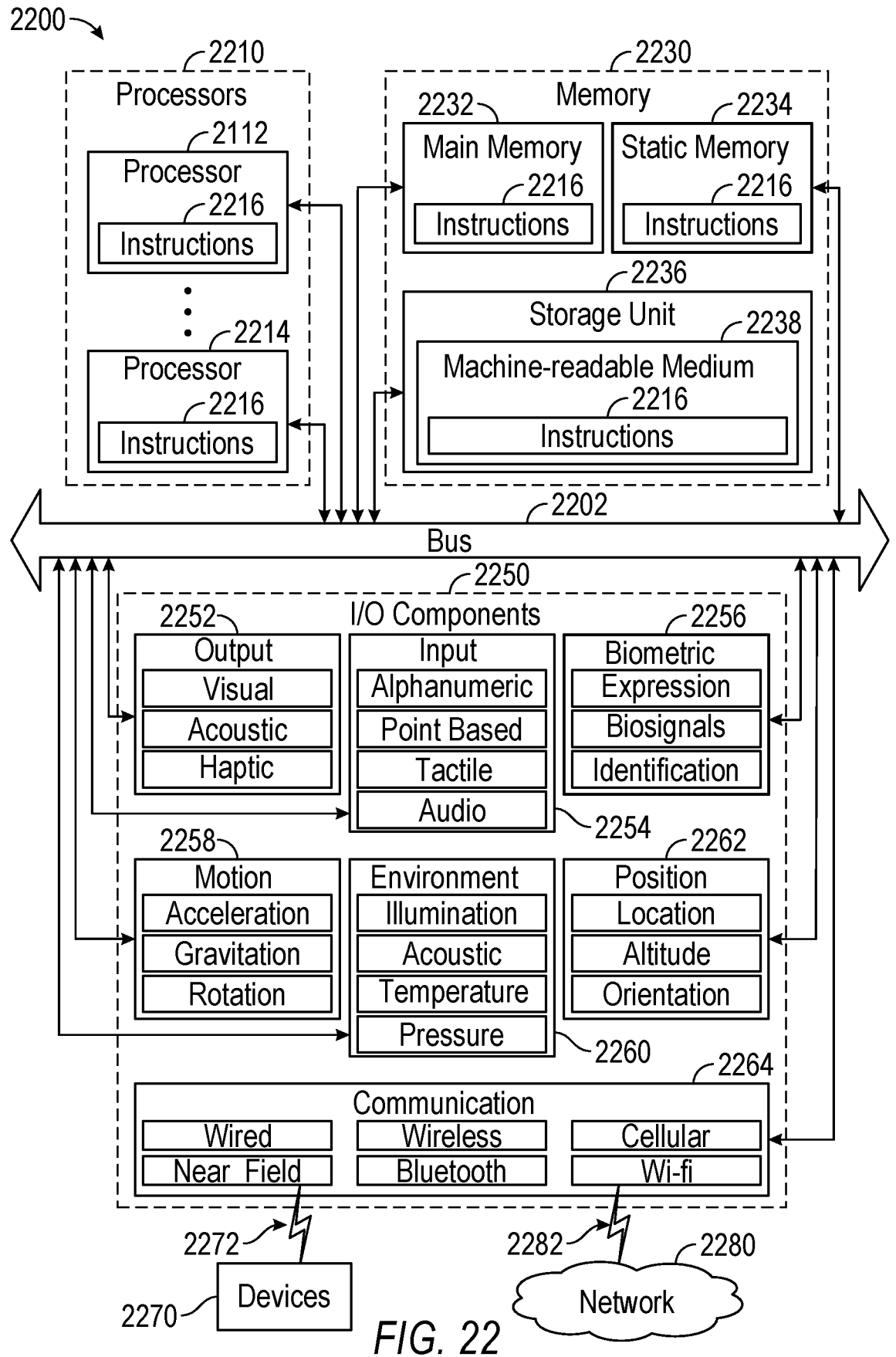
FIG. 22 illustrates a diagrammatic representation of a machine in the form of a computer system within which a set of instructions may be executed for causing a machine to perform any one or more of the methodologies discussed herein, according to some embodiments.

FIG. 22 illustrates a diagrammatic representation of a machine 2200 in the form of a computer system within which a set of instructions may be executed for causing the machine 2200 to perform any one or more of the methodologies discussed herein, according to an embodiment. Specifically, FIG. 22 shows a diagrammatic representation of the machine 2200 in the example form of a computer system, within which instructions 2216 (e.g., software, a program, an application, an applet, an app, or other executable code) for causing the machine 2200 to perform any one or more of the methodologies discussed herein may be executed. For example, the instructions 2216 may cause the machine 2200 to execute the method 300 described above with respect to FIG. 3, the method 400 described above with respect to FIG. 4, the method 900 described above with respect to FIG. 9, the method 1500 described above with respect to FIG. 15, and the method 1600 described above with respect to FIG. 16. Instructions 2216 transform the general, non-programmed machine 2200 into a particular machine 2200 programmed to carry out the described and illustrated functions in the manner described. In alternative embodiments, the machine 2200 operates as a standalone device or may be coupled (e.g., networked) to other machines. In a networked deployment, the machine 2200 may operate in the capacity of a server machine or a client machine in a server-client network environment, or as a peer machine in a peer-to-peer (or distributed) network environment. The machine 2200 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 2216, sequentially or otherwise, that specify actions to be taken by the machine 2200. Further, while only a single machine 2200 is illustrated, the term "machine" shall also be taken to include a collection of machines 2200 that individually or jointly execute the instructions 2216 to perform any one or more of the methodologies discussed herein.

The machine 2200 may include processors 2210, memory 2230, and I/O components 2250, which may be configured to communicate with each other such as via a bus 2202. In an embodiment, the processors 2210 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2212 and a processor 2214 that may execute the instructions 2216. The term "processor" is intended to include multi-core processors that may comprise two or more independent processors (sometimes referred to as "cores") that may execute instructions contemporaneously. Although FIG. 22 shows multiple processors 2210, the machine 2200 may include a single processor with a single core, a single processor with multiple cores (e.g., a multi-core processor), multiple processors with a single core, multiple processors with multiples cores, or any combination thereof.

The memory 2230 may include a main memory 2232, a static memory 2234, and a storage unit 2236 including machine-readable medium 2233, each accessible to the processors 2210 such as via the bus 2202. The main memory 2232, the static memory 2234, and the storage unit 2236 store the instructions 2216 embodying any one or more of the methodologies or functions described herein. The instructions 2216 may also reside, completely or partially, within the main memory 2232, within the static memory 2234, within the storage unit 2236, within at least one of the processors 2210 (e.g., within the processor's cache memory), or any suitable combination thereof, during execution thereof by the machine 2200.

The I/O components 2250 may include a wide variety of components to receive input, provide output, produce output, transmit information, exchange information, capture measurements, and so on. The specific I/O components 2250 that are included in a particular machine will depend on the type of machine. For example, portable machines such as mobile phones will likely include a touch input device or other such input mechanisms, while a headless server machine will likely not include such a touch input device. It will be appreciated that the I/O components 2250 may include many other components that are not shown in FIG. 22. The I/O components 2250 are grouped according to functionality merely for simplifying the following discussion, and the grouping is in no way limiting. In various embodiments, the I/O components 2250 may include output components 2252 and input components 2254. The output components 2252 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 2250 may include biometric components 2256, motion components 2253, environmental components 2260, or position components 2262, among a wide array of other components. The motion components 2253 may include acceleration sensor components (e.g., accelerometer), gravitation sensor components, rotation sensor components (e.g., gyroscope), and so forth. The environmental components 2260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2262 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2250 may include communication components 2264 operable to couple the machine 2200 to a network 2230 or devices 2270 via a coupling 2232 and a coupling 2272, respectively. For example, the communication components 2264 may include a network interface component or another suitable device to interface with the network 2230. In further examples, the communication components 2264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2270 may be another machine or any of a wide variety of peripheral devices (e.g., a peripheral device coupled via a USB).

Moreover, the communication components 2264 may detect identifiers or include components operable to detect identifiers. For example, the communication components 2264 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2264, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hard-wired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 2200 including processors 2210), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 2200, but deployed across a number of machines 2200. In some example embodiments, the processors 2210 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 2230, 2232, 2234, and/or the memory of the processor(s) 2210) and/or the storage unit 2236 may store one or more sets of instructions 2216 and data structures (e.g., software) embodying or utilized by any one or more of the methodologies or functions described herein. These instructions (e.g., the instructions 2216), when executed by the processor(s) 2210, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 2216 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 2230 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2230 or a portion of the network 2230 may include a wireless or cellular network, and the coupling 2232 may be a Code Division Multiple Access (CDMA) connection, a Global System for Mobile communications (GSM) connection, or another type of cellular or wireless coupling. In this example, the coupling 2232 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 2270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:

receiving a request for providing an access to a resource;

identifying an attribute-based access control policy associated with the resource that matches the request;

converting metadata associated with the resource into a data object in a standardized data format;

evaluating a predicate included in the attribute-based access control policy based on the data object converted from metadata associated with the resource;

authorizing the request based on the evaluating of the predicate;

in response to authorizing the request, generating a tree structure representing a serialized token that comprises one or more verified permissions associated with the request;

converting the tree structure representing the serialized token into a text string; and providing the access to the resource based on the text string.

2. The method of claim 1, wherein the attribute-based access control policy corresponds to an attribute-based permission.

3. The method of claim 2, wherein the attribute-based permission is represented by the text string that comprises a namespace identifier, a product identifier, a resource identifier, and the predicate, the predicate including an attribute of the resource.

4. The method of claim 1, further comprising:

transmitting an Application Programming Interface (API) call to retrieve the metadata associated with the resource from a cache.

5. The method of claim 4, wherein the API call comprises a resource type identifier and a resource identifier.

6. The method of claim 4, further comprising:

determining that the metadata associated with the resource cannot be retrieved from the cache; and transmitting a further API call to retrieve the metadata associated with the resource from a system of record where the resource can be read.

7. The method of claim 1, further comprising:

using a mapping function to convert the metadata associated with the resource into the data object in the standardized data format; and using the data object in the standardized data format to determine whether a condition provided in the predicate is satisfied.

8. The method of claim 7, wherein the predicate is a Boolean-valued function, and wherein the using the data object in the standardized data format to determine whether the condition provided in the predicate is satisfied further comprises:

determining that a value of the predicate is true based on the data object in the standardized data format.

9. The method of claim 1, wherein the identifying the attribute-based access control policy associated with the resource that matches the request further comprises:

generating a graph that represents one or more attribute-based access control policies; and traversing the graph to identify the attribute-based access control policy that matches the request.

10. The method of claim 1, further comprising:

generating a token to represent the attribute-based access control policy;

using a digital signature algorithm to sign the token; and passing the token to a service associated with the resource for providing the access to the resource.

11. A system comprising:

a memory storing instructions; and one or more hardware processors communicatively coupled to the memory and configured by the instructions to perform operations comprising:

receiving a request for providing an access to a resource;

identifying an attribute-based access control policy associated with the resource that matches the request;

converting metadata associated with the resource into a data object in a standardized data format;

evaluating a predicate included in the attribute-based access control policy based on the data object converted from metadata associated with the resource;

authorizing the request based on the evaluating of the predicate;

in response to authorizing the request, generating a tree structure representing a serialized token that comprises one or more verified permissions associated with the request;

converting the tree structure representing the serialized token into a text string; and providing the access to the resource based on the text string.

12. The system of claim 11, wherein the attribute-based access control policy corresponds to an attribute-based permission.

13. The system of claim 12, wherein the attribute-based permission is represented by the text string that comprises a namespace identifier, a product identifier, a resource identifier, and the predicate, the predicate including an attribute of the resource.

14. The system of claim 11, wherein the operations further comprise:

transmitting an Application Programming Interface (API) call to retrieve the metadata associated with the resource from a cache.

15. The system of claim 14, wherein the API call comprises a resource type identifier and a resource identifier.

16. The system of claim 14, wherein the operations further comprise:

determining that the metadata associated with the resource cannot be retrieved from the cache; and transmitting a further API call to retrieve the metadata associated with the resource from a system of record where the resource can be read.

17. The system of claim 11, wherein the operations further comprise:

using a mapping function to convert the metadata associated with the resource into the data object in the standardized data format, and using the data object in the standardized data format to determine whether a condition provided in the predicate is satisfied.

18. The system of claim 17, wherein the predicate is a Boolean-valued function, and wherein the using the data object in the standardized data format to determine whether the condition provided in the predicate is satisfied further comprises:

determining that a value of the predicate is true based on the data object in the standardized data format.

19. The system of claim 11, wherein the identifying the attribute-based access control policy associated with the resource that matches the request further comprises:

generating a graph that represents one or more attribute-based access control policies; and traversing the graph to identify the attribute-based access control policy that matches the request.

20. A computer-readable storage medium comprising instructions that, when executed by a processing device, cause the processing device to perform operations comprising:

receiving a request for providing an access to a resource;

identifying an attribute-based access control policy associated with the resource that matches the request;

converting metadata associated with the resource into a data object in a standardized data format;

evaluating a predicate included in the attribute-based access control policy based on the data object converted from metadata associated with the resource;

authorizing the request based on the evaluating of the predicate;

in response to authorizing the request, generating a tree structure representing a serialized token that comprises one or more verified permissions associated with the request;

converting the tree structure representing the serialized token into a text string; and providing the access to the resource based on the text string.

\* \* \* \* \*